United States Patent
Noyelle et al.

(10) Patent No.: US 11,074,028 B2
(45) Date of Patent: Jul. 27, 2021

(54) CALIBRATION METHOD AND SYSTEM FOR TILED DISPLAYS

(71) Applicant: BARCO N.V., Kortrijk (BE)

(72) Inventors: Greet Rosa Noyelle, Izegem (BE); Jan Vandaele, Wevelgem (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/633,873

(22) PCT Filed: Jul. 25, 2018

(86) PCT No.: PCT/EP2018/070241
§ 371 (c)(1),
(2) Date: Jan. 24, 2020

(87) PCT Pub. No.: WO2019/020725
PCT Pub. Date: Jan. 31, 2019

(65) Prior Publication Data
US 2020/0241828 A1    Jul. 30, 2020

(30) Foreign Application Priority Data

Jul. 26, 2017 (GB) .................................. 1712011
May 4, 2018 (GB) .................................. 1807416

(51) Int. Cl.
*G06F 3/14* (2006.01)
*G06T 7/70* (2017.01)
*G09G 3/3208* (2016.01)

(52) U.S. Cl.
CPC .............. *G06F 3/1446* (2013.01); *G06T 7/70* (2017.01); *G09G 3/3208* (2013.01);
(Continued)

(58) Field of Classification Search
CPC ............ G06F 3/1446; G09G 2300/026; G09G 2356/00; G09G 2320/0693
See application file for complete search history.

(56) References Cited

U.S. PATENT DOCUMENTS 8,007,121 B2   8/2011  Elliott et al.
8,485,689 B2   7/2013  Patterson et al.
(Continued)

FOREIGN PATENT DOCUMENTS

EP    1550947 A2    7/2005
EP    2128846 A1   12/2009
(Continued)

OTHER PUBLICATIONS

International Preliminary Report on Patentability in corresponding PCT/EP2018/070241 dated Jan. 28, 2020.
(Continued)

*Primary Examiner* — Laurence J Lee
(74) *Attorney, Agent, or Firm* — Hamre, Schumann, Mueller & Larson, P.C.

(57) ABSTRACT

A method or system for displaying of specific types of image on a tiled display system based on addressable display technologies, e.g. pixelated displays especially fixed format pixelated displays where specific images are generated on a plurality of display tiles, positioned adjacent each other to form a large display panel or device. The method or system includes specific pixelated image information displayed on the tiled display device from which artefacts such as seams can be reduced in visibility.

20 Claims, 24 Drawing Sheets

(52) U.S. Cl.
CPC ............... *G09G 2300/026* (2013.01); *G09G 2320/0693* (2013.01); *G09G 2356/00* (2013.01)

(56) References Cited

U.S. PATENT DOCUMENTS

| | | |
|---|---|---|
| 8,616,509 B2 | 12/2013 | Declerck et al. |
| 2014/0193037 A1 | 7/2014 | Stitzinger |
| 2014/0355819 A1* | 12/2014 | Naruse .................. G06F 3/1446 382/103 |
| 2015/0279037 A1* | 10/2015 | Griffin .................. G09G 5/006 345/1.3 |
| 2017/0075638 A1* | 3/2017 | Poornachandran .......................... H04N 5/23229 |
| 2017/0337028 A1* | 11/2017 | Fan ....................... G06F 3/0346 |
| 2018/0024800 A1* | 1/2018 | Aghababyan ............ G09G 5/14 345/1.3 |
| 2018/0332335 A1* | 11/2018 | Mullins .................. G09G 5/14 |

FOREIGN PATENT DOCUMENTS

| | | |
|---|---|---|
| EP | 2998858 A1 | 3/2016 |
| WO | 2019020725 A1 | 1/2019 |

OTHER PUBLICATIONS

International Search Report and Written Opinion in corresponding PCT/EP2018/070241 dated Sep. 20, 2018.
British Search Report in related British application GB1807416.1 dated Oct. 15, 2019.

\* cited by examiner

CALIBRATION METHOD AND SYSTEM FOR TILED DISPLAYS

The present invention relates to a method or system for displaying of specific types of images on a tiled display system based on addressable display technologies, the tiled display having a plurality of display tiles, positioned adjacent each other, the method or system comprising calibrating the display system.

BACKGROUND

The use of large format tiled displays finds applications in control rooms, for advertising, for displaying at events, etc. A plurality of display tiles are fixed adjacent to each other and the imaging output is spread over the different display tiles. The display tiles or modules are mechanically coupled together in order to form the full large format display. The space or gap between the different tiles or modules of the display is called a seam.

One important display quality is uniformity in color and brightness. For a tiled display, obtaining color and brightness uniformity is often more difficult, because the tiles and their seams form a regular structure, which is very easily detected by the human eye. Current displays may have a large bit-depth (16 bits and more) so that they can be very smooth after color/brightness calibration. As a result the tiled display looks very smooth overall. Nevertheless, it is known that if a human eye observes a uniform plane, even the smallest local non-uniformities, such as a small variance on the seams, becomes visible.

Another problem can occur if an old tie is replaced by a new tile. The old tiles surrounding the new tile will have aged so that the new tile may appear a different colour because of a different colour point or it may have a different brightness.

SUMMARY OF THE INVENTION

An aspect of the present invention is the provision of a tiled display system comprising: two or more electronic display tiles; each electronic display tile having a display surface that comprises a lattice of discrete light emitting devices (DLED), each of the two or more electronic display tiles displaying a first optical identification by activating some of the discrete light emitting devices on the display tile, the first optical identification being unique to the display tile it is to identify. This allows the identification of tiles by means of a simple photograph. If the display is designed for correct operation outdoors the image displayed should be visible in sunlight so that identification can be performed at all light levels.

The first optical identification can comprise first discrete light emitting devices (DLED) in a first state and second discrete light emitting devices (DLED) in a second state, the first and second states of the discrete light emitting devices (DLED) being optically different. The first and second states can differ optically in a color characteristic or brightness. Discrete light emitting devices can have good light output which makes identification easier. First discrete light emitting devices (DLED) can emit red light and second discrete light emitting devices (DLED) emit white light. This combination has been found to be easily identified. Alternatively first discrete light emitting devices (DLED) can be dark, e.g. black, and second discrete light emitting devices (DLED) emit white light.

The first optical identification can code for a number. A number is simple and has been found to be easily identified. Each digit of the number can be coded by one of the first discrete light emitting devices (DLED). This is the most efficient use of light emitting devices.

When the first optical identification codes for a number, the first discrete light emitting devices (DLED) can be arranged in rows or columns, each number being coded by one or two rows or columns of the first discrete light emitting devices (DLED). Two rows provide even better recognition of the codes.

The tiled display system can also include a digital camera for taking a digital picture of the tiled display, and a digital picture analysis unit for analyzing the digital picture to determine the relative positions of the two or more electronic display tiles. Camera picture analysis can be done quickly and accurately.

The discrete light emitting devices can be Light Emitting Diodes (LED) or Organic Light Emitting Diodes (OLED). These are readily available and have a good light output.

The tiled display system can be configured to identify a certain display tile from the digital picture and to control sending image data to the certain display tile. This allows more secure addressing of a tile.

One the tile display device of the tiled display system two or more electronic display tiles can display a second optical identification by activating some of the discrete light emitting devices on the two or more electronic display tiles, the second optical identification identifying a position on a seam between adjacent display tiles. This allows identification of seams.

The two or more electronic display tiles can display two second optical identifications by activating some of the discrete light emitting devices on the two or more electronic display tiles, the two second optical identifications identifying two different positions on the seam between adjacent display tiles. With two positions the course of the seam can be identified.

The digital picture analysis unit can be configured to analyze the digital picture to determine the position of the seam. Automatic detection of the seams increases the speed of calibration.

The display system can be configured to apply a distributed brightness and/or color variation correction signal to the two or more electronic display tiles, said distributed brightness and/or color variation correction signal taking into account the seam so as to influence the visual perception of the seam or Fast Field Calibration is carried out. The purpose of FFC is to correct the brightness differences of Red, Green and Blue at the module level, preferable by taking 1 picture only. The display tile can be driven to provide various types of markers via displayed patterns, e.g. to provide a module optical ID. Corner points of the modules can be in the OFF-state for FFC. Such a corner marker or optical ID can be located in the corner of the image, whereby one optical ID-pixel can comprise 3*3 DLEDs. The DLEDs are preferably in the OFF-state. Only 1 optical ID per camera picture is required instead of 1 optical ID per module. The optical ID is used (by image processing) to identify the number of the picture and position of the modules relative to the position of the optical ID on the camera picture. Red, green and blue patterns can be displayed per module. Each module has one green one blue and one red field.

The display system can be configured to alter one or more light emission characteristics of the DLEDs adjacent to the seam to a value of an average of light or spectral intensity in the seam and the image displayed adjacent to the seam in order to compensate for the reduced light emission in the seam. This makes for a better display of images.

The present invention in another aspect provides a method of operating a tiled display having two or more electronic display tiles; each electronic display tile having a display surface that comprises a lattice of discrete light emitting devices (DLED), the method comprising:
displaying on each of the two or more electronic display tiles a first optical identification by activating some of the discrete light emitting devices on the display tile, the first optical identification being unique to the display tile it is to identify.

The method can include displaying the first optical identification by bringing first discrete light emitting devices (DLED) into a first state and second discrete light emitting devices (DLED) into a second state, the first and second states of the discrete light emitting devices (DLED) being optically different. Preferably, the first and second states differ optically in a color characteristic or brightness.

The first discrete light emitting devices (DLED) can emit red light and second discrete light emitting devices (DLED) emit white light. Alternatively first discrete light emitting devices (DLED) can be dark, e.g. black and second discrete light emitting devices (DLED) emit white light.

The first optical identification can code for a number. Each digit of the number can be coded by one of the first discrete light emitting devices (DLED).

Coding the first optical identification for a number, can be done by each additional digit in the number being coded by the addition of one of the first discrete light emitting devices (DLED).

Coding the first optical identification for a number can be done by the first discrete light emitting devices (DLED) being arranged in rows or columns, each number being coded by one or two rows or columns of the first discrete light emitting devices (DLED).

The method can also include:
obtaining a digital picture of the tiled display with a digital camera, and
analyzing the digital picture to determine the relative positions of the two or more electronic display tiles.

The discrete light emitting devices can be Light Emitting Diodes or Organic Light Emitting Diodes.

The method can include identifying a certain display tile from the digital picture and controlling sending of image data to the certain display tile.

The method can include displaying on the two or more electronic display tiles a second optical identification by activating some of the discrete light emitting devices on the two or more electronic display tiles, the second optical identification identifying a position on a seam between adjacent display tiles.

The two or more electronic display tiles can display two second optical identifications by activating some of the discrete light emitting devices on the two or more electronic display tiles, the two second optical identifications identifying two different positions on the seam between adjacent display tiles.

The method can include analyzing the digital picture to determine the position of the seam.

A distributed brightness and/or color variation correction signal can be applied to the two or more electronic display tiles, said distributed brightness and/or color variation correction signal taking into account the seam so as to influence the visual perception of the seam or Fast Field Calibration is carried out.

The method can include altering one or more light emission characteristics of the DLEDs adjacent to the seam to a value of an average of light or spectral intensity in the seam and the image displayed adjacent to the seam in order to compensate for the reduced light emission in the seam.

In a further aspect, a computer program product can be provided comprising software which when executed on a processing engine, is configured to execute any of the methods of the present invention. A non-transitory signal storage means can store the computer program product.

In a further aspect a tiled display is provide comprising two or more electronic display tiles; each electronic display tile having a display surface that comprises a lattice of discrete light emitting devices (DLED), each of the two or more electronic display tiles displaying a first optical identification by activating some of the discrete light emitting devices on the display tile, the first optical identification being unique to the display tile it is to identify.

DETAILED DESCRIPTION OF THE INVENTION

The present invention relates to a method or system for displaying of specific types of image on a tiled display system. The display method and system are based on addressable display technologies, e.g. pixelated displays especially fixed format pixelated display such as for example phosphorescent, electroluminescent, organic or inorganic emissive, plasma, reflective or transmissive or other known display technologies. The specific type of pixelated tiled display device with fixed format display tiles is not considered to prevent application of methods of embodiments of the present invention. Specific images are generated on a plurality of display tiles, positioned adjacent each other to form a large display panel or device. Each tile can be a fixed format display. The tiled display may e.g. be built up as a matrix of display tiles. The number of display tiles used may be dependent on the size of the tiled display device required and on the size of the individual display tiles. A method or system according to embodiments of the present invention comprises specific pixelated image information displayed on the tiled display device.

In embodiments of the present invention, the method or system may be configured for calibrating the display system. Such a calibration step may be performed after manufacturing or assembly of the display system. It is an advantage of embodiments of the present invention that the calibration can be performed at any time, e.g. on site, thus allowing to take into account changes in the tiled display device after installation.

Figure 1:
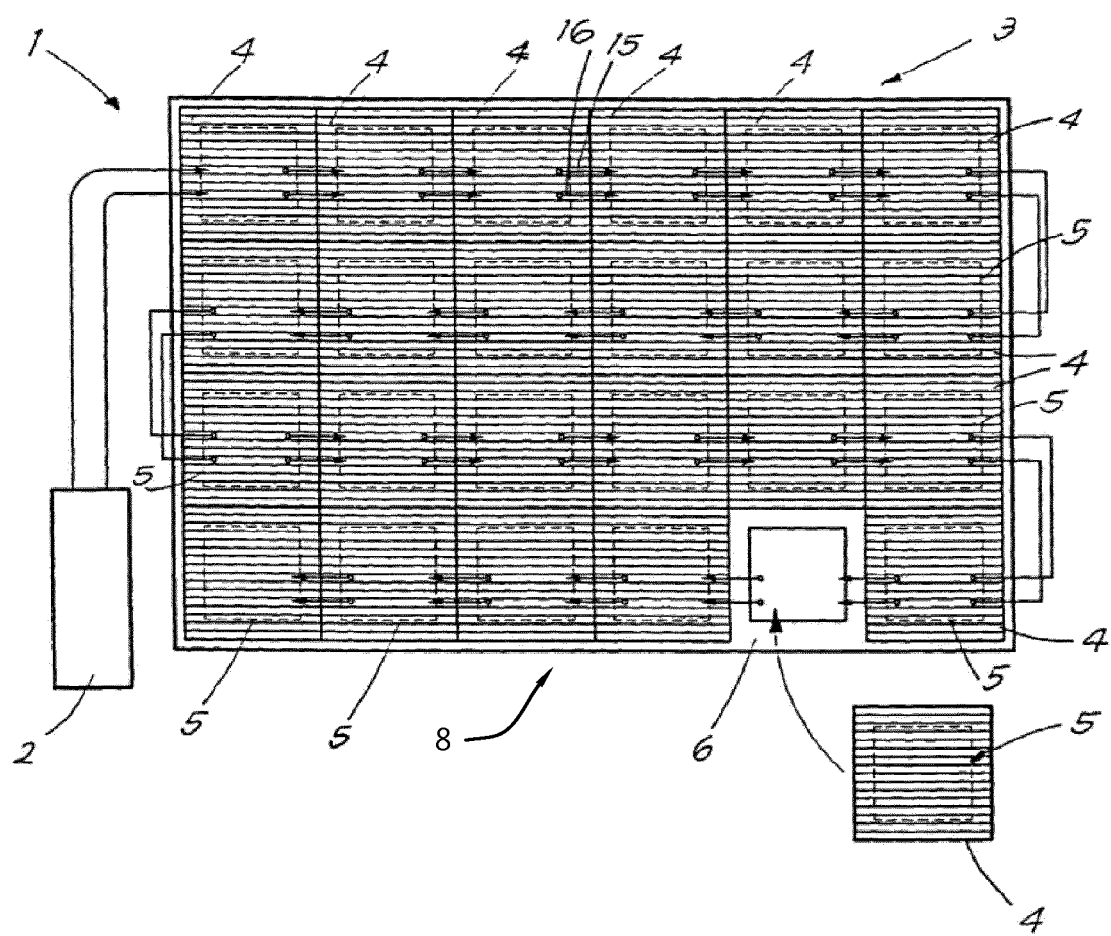
FIG. 1 shows a tiled display device that can be used with embodiments of the present invention.

FIG. 1 shows an example of electronic tiled display 1 with which embodiments of the present invention can be used.

A tiled display comprises two or more electronic display tiles. Each tile has a display surface that comprises a lattice of discrete light emitting devices (DLED) such as Light Emitting Diodes or Organic Light Emitting Diodes. In the following description and claims reference will be made to DLED's whereby this term includes in all cases either Light Emitting Diodes or Organic Light Emitting Diodes.

If the tile is rectangular then there can be N×M DLEDs where N and M are integer numbers.

Figure 2:
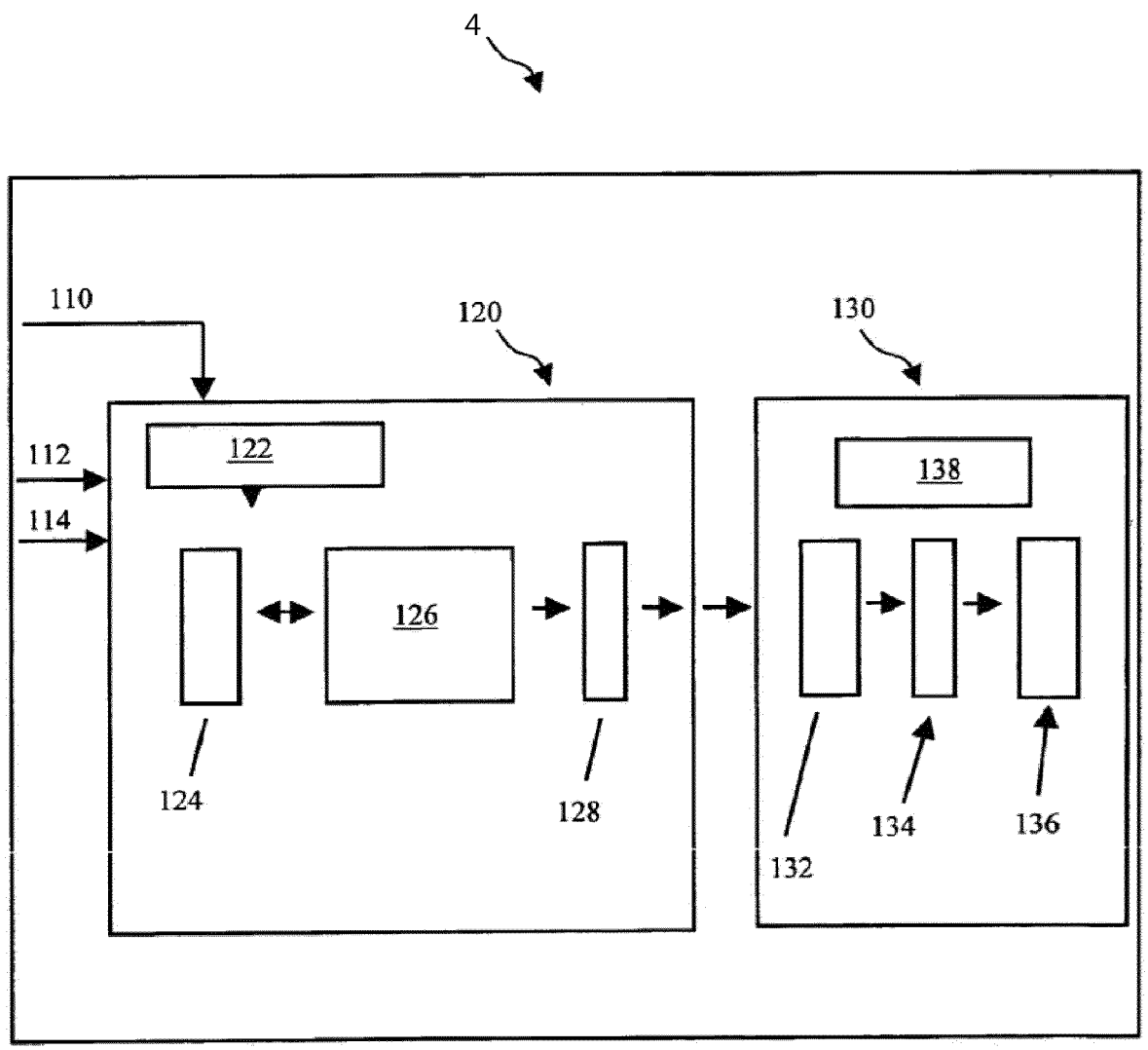
FIG. 2 shows components of a tiled display device that can be used with embodiments of the present invention.

As represented in FIG. 1, the tiled display device 1 according to the invention mainly consists of or comprises a general digital electronic processing unit 2 and a display surface 3 consisting of or comprising a screen which is composed of several display units or tiles 4, whereby every display unit or tile 4 can be equipped with an individual processing unit 5 or a central digital electronic processing unit 2 can be used to control all of the tiles or the central digital electronic processing unit 2 can be used as a master unit with the individual processing units 5 can be slave units. The tiles 4 can be connected with each other by connections 15, 16 which can be connected to the digital electronic processing unit 2. For example, the general digital electronic processing unit 2, also called digitizer or video engine, consists of or comprises an appliance which transforms image or video signals, either coming from an external source or from an internal source, such as a built-in video player, into digitized signals which are suitable for the reproduction of the image on the display surface 3. As represented in FIGS. 2 to 4, the display units or tiles 4 consist of or comprise tile-shaped modules which, as represented in FIG. 1, can be assembled by attaching them to an appropriate supporting structure, for example a frame 6. Examples of supporting structures are described in e.g. U.S. Pat. No. 8,007,121B2 "Support structure for an LED display system", U.S. Pat. No. 8,616,509B2 "Support for direct light displays" and U.S. Pat. No. 8,485,689B2 "Display panel attachment mechanism "all of which are incorporated herein in their entirety.

The tile-shaped modules are preferably fastened in or on the frame 6 in a detachable manner, for example by making use of fastening elements, with which the tile-shaped modules preferably can be quick-fixed, e.g. snapped in the frame 6. The image side 8 of the display units or tiles 4 is equipped with luminous elements such as DLEDs, in particular LED's (Light Emitting Diodes) or OLEDS.

FIG. 2 illustrates a functional block diagram of a display tile or unit 4 which can be used with any of the embodiments of the present invention. A display tile or unit 4 can include any, some or all of an input for power 110 or an on-board a power supply such as a battery, an input for serial data 112, an input for communications data (comm data) 114, a control board 120 and a display board 130. Control board 120 can further include any, some or all of a power regulator 122, a memory 124, a digital electronic processing means such as a field programmable gate array (FPGA) 126 or more generally a processing unit like a microcontroller or microprocessor, and a display buffer 128. The digital electronic processing means is shown as located on the tile 4 but can also be a control from a central digital electronic processing means 2 of FIG. 1 or a combination of central and tile-based digital electronic processing means. The display board 130 can further include any, some or all of a drive buffer 132, an array of signal modulation drivers such as pulse-width modulation (PWM) drivers 134, and an array of DLEDs 136, 138, e.g. in columns 136 and rows 138. In accordance with embodiments of the present invention a tile can have a unique controllable, optical identifier like e.g. a unique controllable, optical ID number. That controllable, optical ID number can be encoded by means of an electronic memory. The memory can be e.g. a DIP switch for example, or for example, the memory can be part of the memory 124 operationally linked to the processing means 126.

According to embodiments of the present invention, a controllable optical identification such as a controllable optical ID number or a controllable optical alphanumeric identifier of a display tile or unit 4 is displayed on the display surface 3 of the display tile or unit 4 e.g. by means of an On Screen Display (OSD) to help operate and control the tiled display device 1. This control can include for example control of sending image data to the correct display tile 4 and/or to help in identifying and evaluating seams between adjacent display tiles or units 4 and also to altering the displayed images to hide the seams. The control can also include FFC (=Fast Field Calibration), including brightness compensation in the field get better uniformity of brightness.

Figure 3A:
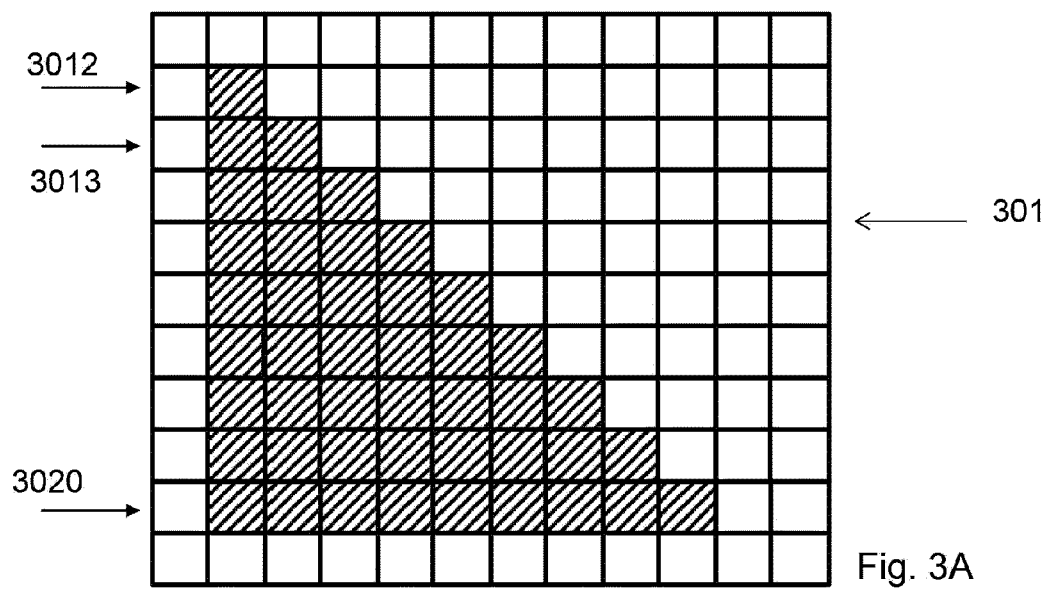
FIGS. 3A, 3B and 4 show controllable optical ID's in accordance with embodiments of the present invention.
Figure 3B:
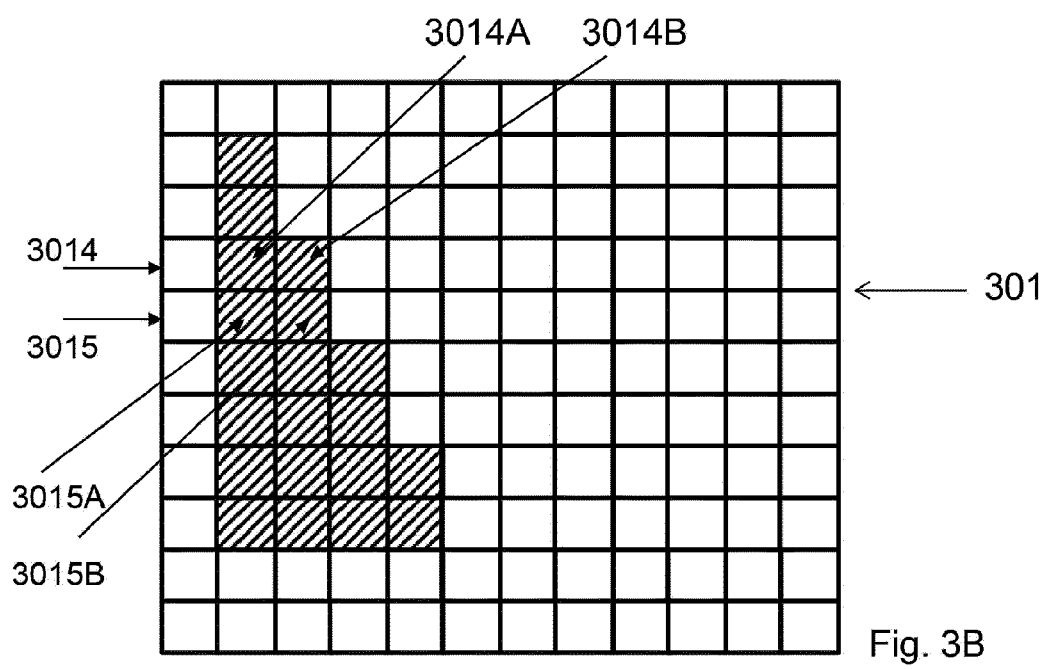
Figure 4:
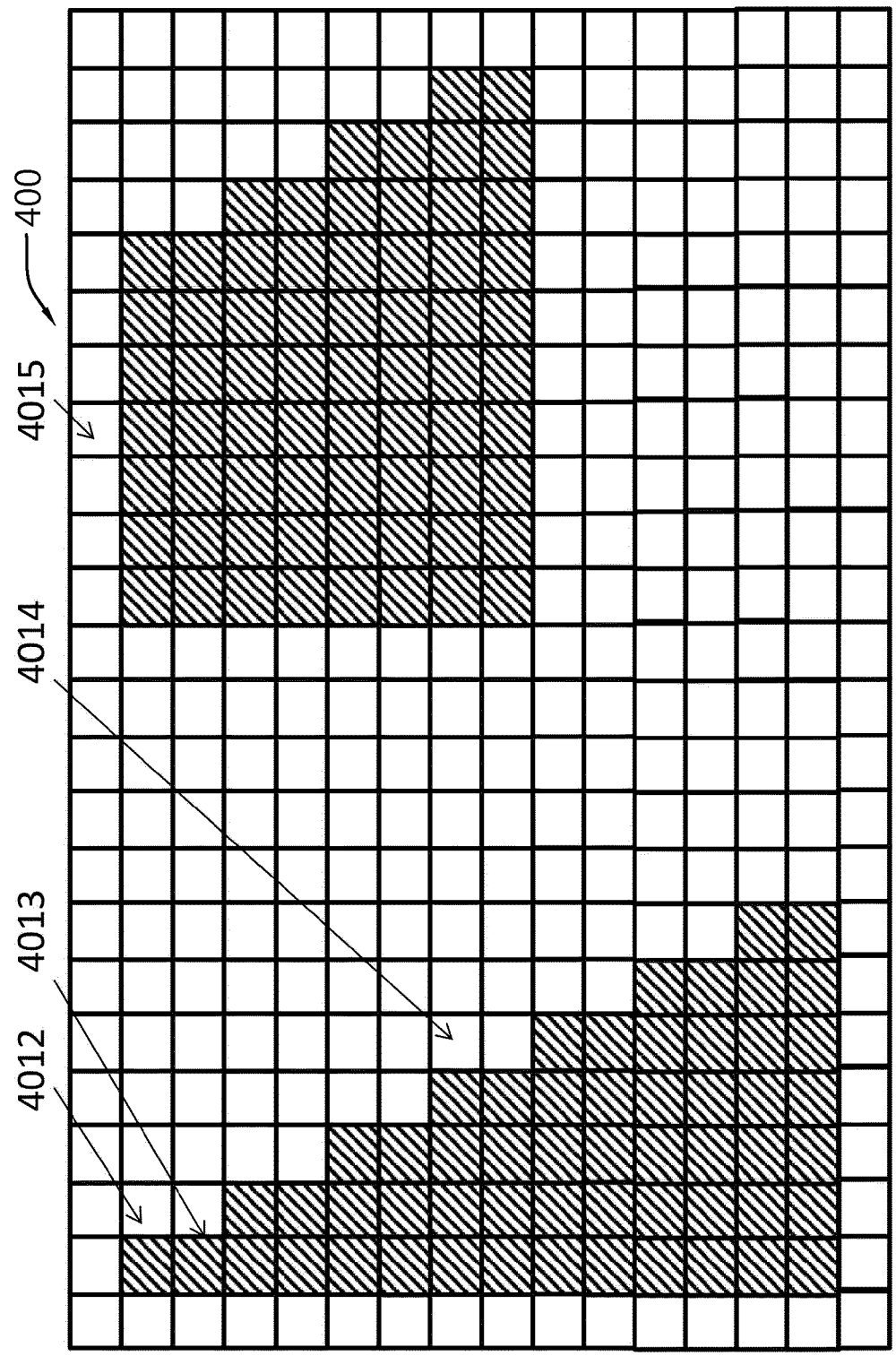

FIGS. 3A and 3B show examples of how numbers and in particular a controllable optical ID number can be displayed on the display surface 3 of a display tile or unit 4.

On FIG. 3A digits from 0 to 9 are represented on a DLED display tile 301 with 11×12 pixels which are shown schematically as rows and columns of squares. Each pixel represents in fact a DLED or a combination of DLEDs.

On the second row of pixels 3012 from the top of the display tile 301, a single pixel is activated to represent a "0" (shown as hatching of one square). On the third row 3013 from the top of the tile 301, two adjacent pixels are activated to represent a "1" (two squares hatched). With each row an additional pixel is activated which codes for another number added until the $10^{th}$ row 3020 from the top of tile 301 where 10 adjacent pixels are activated to represent a "9" (shown as hatched squares).

The number of pixels that are activated is preferably equal to 1+the digit to be encoded i.e. 1 pixel is activated to represent a "0" on the display surface, 2 pixels are activated to represent a "1" on the display surface etc. and 10 pixels are activated to represent a "9" on the display surface. The present invention is not limited to this coding and the skilled person can define other codes to serve the same purpose all of which are included within the scope of the present invention. Any such code involves a relationship between a number of activated DLEDs and the number or alphanumeric ID.

To activate a pixel means to change the state of one or more DLEDs, which forms or form a pixel, from a first to a second state. For example a pixel in a second state is activated whereas in a first state a pixel is inactivated. The first state may be turned off and the second state may be illuminated or turned on.

A pixel in the first state can be but is not necessarily turned off (i.e. a black pixel). The first state can for instance correspond to an illuminated pixel with a particular color point or a particular region of the color space, or for example a choice of Red in a Cie diagram, e.g. in a range 580->640 nm, that is accessible to the pixels of the display tile and the second state can correspond to another color point or another region of the color space accessible to the pixels of the display tile. Therefore in any or all of the embodiments of the present invention the first and second states are optically different and they can serve as elements of controllable optical identifiers, e.g. the optical difference between the controllable optical identifiers can be captured by a camera.

The pixels of the display tile can be RGB pixels, i.e. each comprising Red, Green and Blue DLEDs. When working with RGB pixels, it can be advantageous to have a first state that corresponds to a native red pixel (i.e. the G and B DLEDs of the pixel are turned off while the R DLED of the pixel is turned ON) and a second state that corresponds to white (i.e. the R, G and B DLEDs of the pixel are turned ON to generate white light). The red colour with a white background has been found to be particularly advantageous, e.g. in a far as the optical ID is to be captured by a camera. Alternatively the first state can be discrete light emitting devices (DLED) which are dark, e.g. black and the second state corresponds to white, i.e. second discrete light emitting devices (DLED) emit white light—see FIGS. 16 to 23.

Assuming that a display tile would have a 10 digit controllable optical ID number, the controllable optical ID number being displayed on the tile 301 of FIG. 3A is either 9876543210 or 0123456789 depending on the convention chosen to read a controllable optical ID number, i.e. reading from top to bottom or from bottom to top.

To better discriminate the controllable optically displayed digits, it may be advantageous to duplicate each line as shown on FIG. 3B. For instance, to display an image encoding the digit "1", two pixels (3014A and 3014B) of line or row 3014 are activated as well as two pixels (3015A and 3015B) of line or row 3015.

FIG. 4 shows another example of how the controllable optical ID number of a tile 400 can be displayed according to embodiments of the present invention when the number N of rows or lines of DLEDs on the tile 400 is lower than the number of digits of the controllable optical ID number. In the example of FIG. 4, the display tile 400 has 16 lines while the controllable optical ID number has 11 digits and each digit is encoded on two lines of DLEDs e.g. 4012 and 4013 (as in the example of FIG. 3B). Thus the display tile would need 22 lines but it only has 16. To display the ID number on the 16 lines or rows, each line or row is divided into two parts: the first 7 digits are displayed on the first half of the lines (the left hand half 4014 on FIG. 4) while the last 4 digits are displayed on the second half of the lines (the right hand half 4015 on FIG. 4).

If the number of lines is less than double the number of digits that must be displayed, one can chose for a single line per digit encoding as in the example of FIG. 3A. Alternatively, if the number of columns is sufficient, it is possible to divide each line in three or more parts (4014, 4015) Each part must contain at least 10 columns of DLEDs to allow the representation of digits between 0 (which requires one DLED of one column) to 9 (which requires 10D LEDS each DLED belonging to one of 10 adjacent columns).

Figure 6:
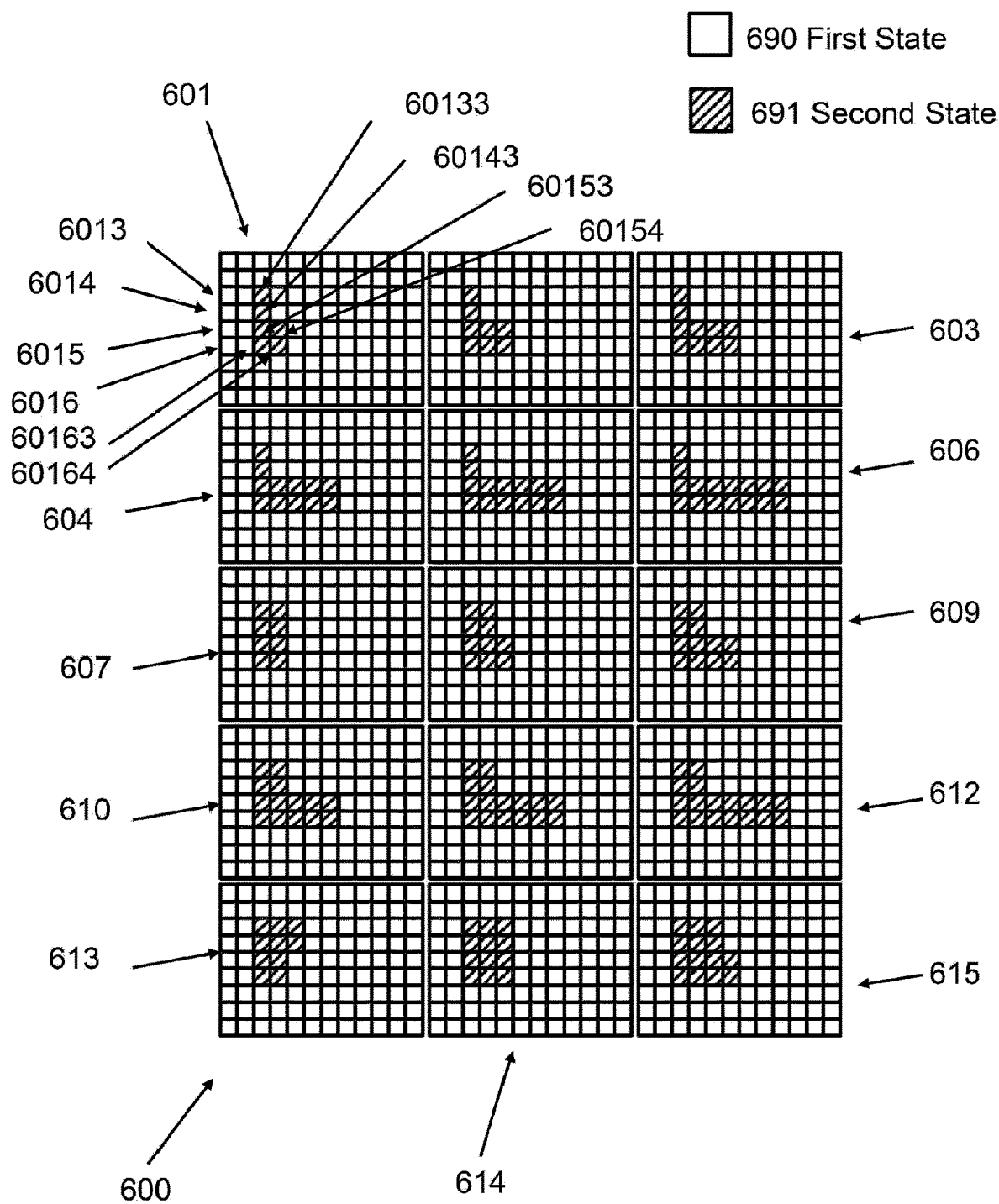
FIG. 6 shows a tiled display showing controllable optical ID's in accordance with an embodiment of the present invention.

A controllable optical ID as described for any of the examples described with reference to FIG. 3 or FIG. 4 can, for example, be positioned vertically so that one reads the rows from top to bottom of bottom to top or instead a controllable optical ID can for example be positioned horizontally so that one reads the columns from left to right of right to left Displaying a controllable optical identifier on each display tile can simplify addressing the display tiles of a tiled display device. In the example of FIG. 6, each tile, like e.g. 601, of the tiled display 600 has 9 rows of twelve DLEDs (this is only an example and an actual of tile can have thousands or millions of DLEDs). The display tiles 601 have received a command signal to display their controllable optical ID number on their display surface. For the sake of simplicity, the controllable optical ID number of a display tile has been limited to a two digit number. Each digit is encoded as in the examples of FIG. 3B. Line 6013 and 6014 of the tile 601 are used to encode the first digit of the controllable optical ID number of tile 601. In this example, pixel 60133 (the third pixel of the third row of tile 601) and pixel 60143 (the third pixel of the fourth row of tile 201) are activated (i.e. in the second state 691—hatched), while the other pixels of the third and fourth lines or rows of tile 601 are in the first state 690. The first digit is equal to 0.

The second digit of the controllable optical ID number of tile 601 is displayed on the fifth row 6015 and the sixth row 6016. Pixels 60153 and 60154, the third and fourth pixels of the fifth row of DLEDs on tile 601, are activated as well as pixels 60163 and 60164 on the sixth row of DLEDs on tile 601.

The second digit is equal to 1.

The controllable optical ID number of tile 601 displayed on the display surface of tile 601 is thus 01.

The controllable optical ID numbers displayed on the tiles of the display device 600 of FIG. 6 are summarized in Table 1. The column "Tile #" gives the number assigned to a display tile for the purpose of describing the invention. The column "ID #" gives the controllable optical ID number of the tile as stored in the memory of that tile and the number displayed on the display surface of the display tile as seen in FIG. 6.

TABLE 1

| Tile # | ID # |
|---|---|
| 601 | 01 |
| 602 | 02 |
| 603 | 03 |
| 604 | 04 |
| 605 | 05 |
| 606 | 06 |
| 607 | 11 |
| 608 | 12 |
| 609 | 13 |
| 610 | 14 |
| 611 | 15 |
| 612 | 16 |
| 613 | 21 |
| 614 | 22 |
| 615 | 23 |

A digital camera 253 which can be a monochrome camera but is preferably a color camera (not shown on FIG. 1 or FIG. 6) can take a digital picture 660 (not shown) which can be a digital monochrome or preferably a digital color picture 660 of the tiled display 1, 301, or 601 (i.e. in any of the embodiments of the present invention, e.g. shown in FIGS. 1 to 6).

By applying image processing techniques to the digital picture captured by the digital camera 253, the controllable optical ID numbers displayed on the display surface can be isolated and identified. The relative position of the controllable optical ID numbers with respect to the display tiles and the display device 1 can be extracted based on the position of the pixels of the digital camera 253, which were exposed to light emitted by the DLEDs of a given display tile used to encode the controllable optical ID number of that tile and the pixels of the digital picture 660 which capture the image(s) which capture the controllable optical ID numbers.

Figure 7:
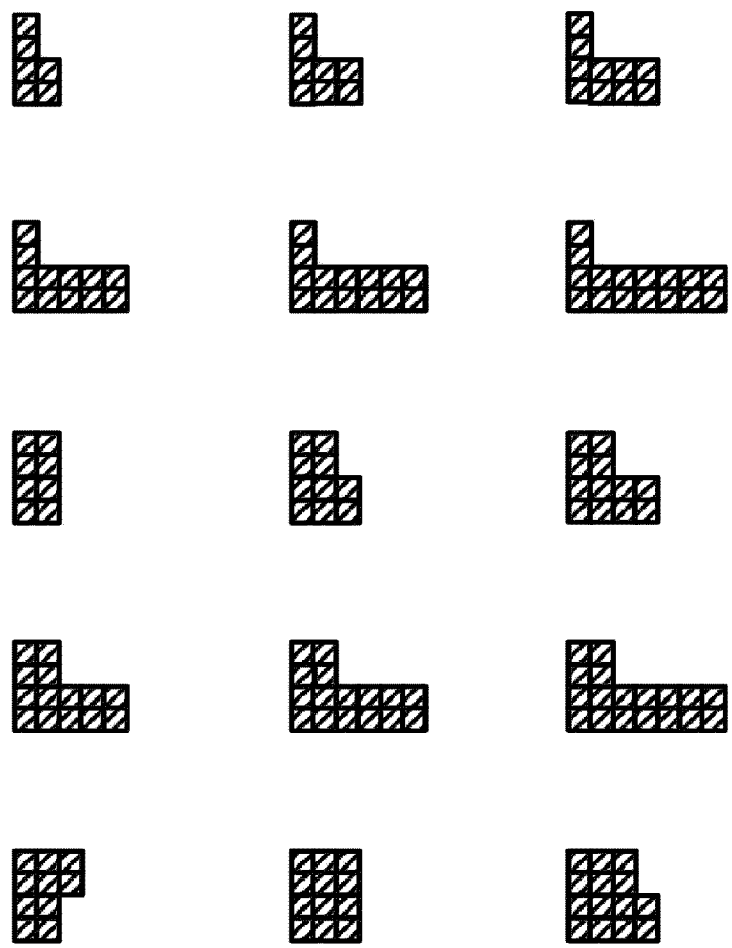
FIG. 7 shows digital images that can be obtained by elementary digital processing techniques with any of the embodiments of the present invention.

FIG. 7 shows an example of digital images that can be obtained by elementary digital processing techniques with any of the embodiments of the present invention.

Figure 5:
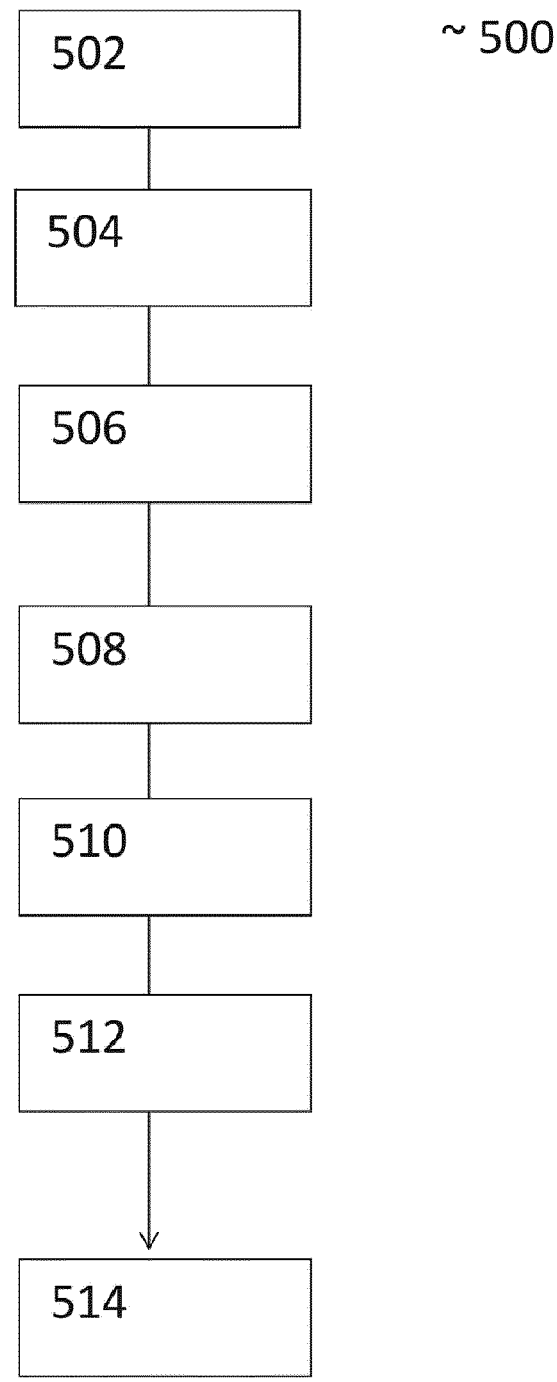
FIG. 5 shows a method of calibrating a tiled display device in accordance with an embodiment of the present invention.

A method 500 according to an embodiment of the present invention is shown in FIG. 5. Let us consider an example where pixels in the first state emit "native red" (i.e. if Red, Green and Blue LEDs are used in the display tile, only the RED led is turned on in the first state) and pixels in the second state emit "white light" (for those pixels, the Red, Green and Blue LEDs are turned ON e.g. at their maximum intensity). The present invention is not limited to this arrangement. For example, alternatively first discrete light emitting devices (DLED) can be dark, e.g. black and second discrete light emitting devices (DLED) emit white light see FIGS. 16 to 23.

In a first step 502, a red filter is applied to the digital color picture 660 to yield a red digital color picture 661 (not shown).

In a second step 504 a threshold is applied to the pixels of picture 661. All pixels shown on the digital picture 661 for which the green and blue amplitudes are above a first threshold are set at the maximum intensity while pixels for which the green and blue amplitudes are below the first threshold are set at the minimum intensity.

FIG. 7 shows the result: only the pixels of the tiled display 600 and used to display the controllable optical ID number of a tile have a non-zero intensity in the picture 661. In step 506, the relative positions of those pixels are determined in the picture 661 in function of the formats used to encode the digital pictures.

In step 508 the controllable optical ID numbers can be evaluated by additional image processing (e.g. pattern recognition). In this example, a single digit is encoded at the intersection of two lines and one column.

In step 510 a mask is defined, simulating the position of all DLEDS in a display tile comprising DLED module and linked to row and column of the DLED in the module. In step 512 the controllable optical ID is then mapped onto this mask resulting in '0' and '1' and then per line, and the sum is made of all '1's', resulting in numbers.

In step 514 once the relative position of the tiles is known, it is possible to determine which image data must be displayed by a given tile.

Figure 8:
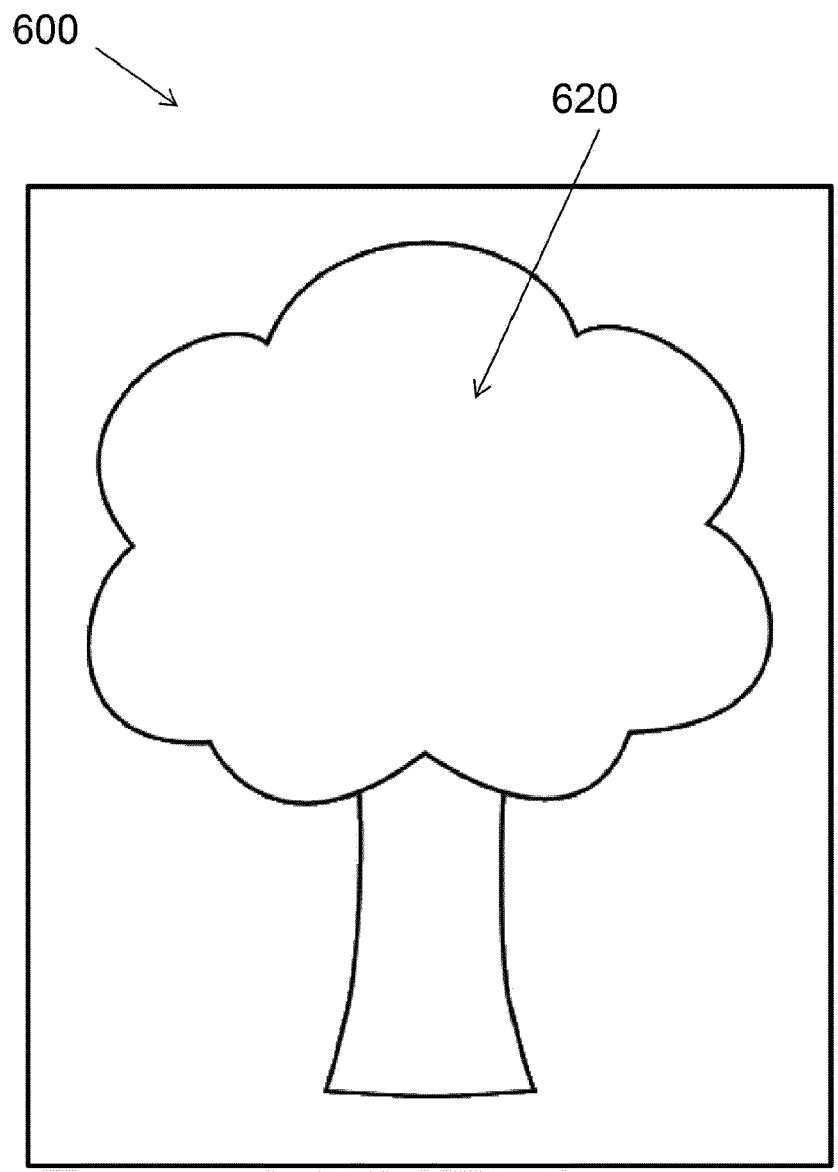
FIG. 8 shows an image that can be displayed on a tiled display device according to any of the embodiments of the present invention.
Figure 9:
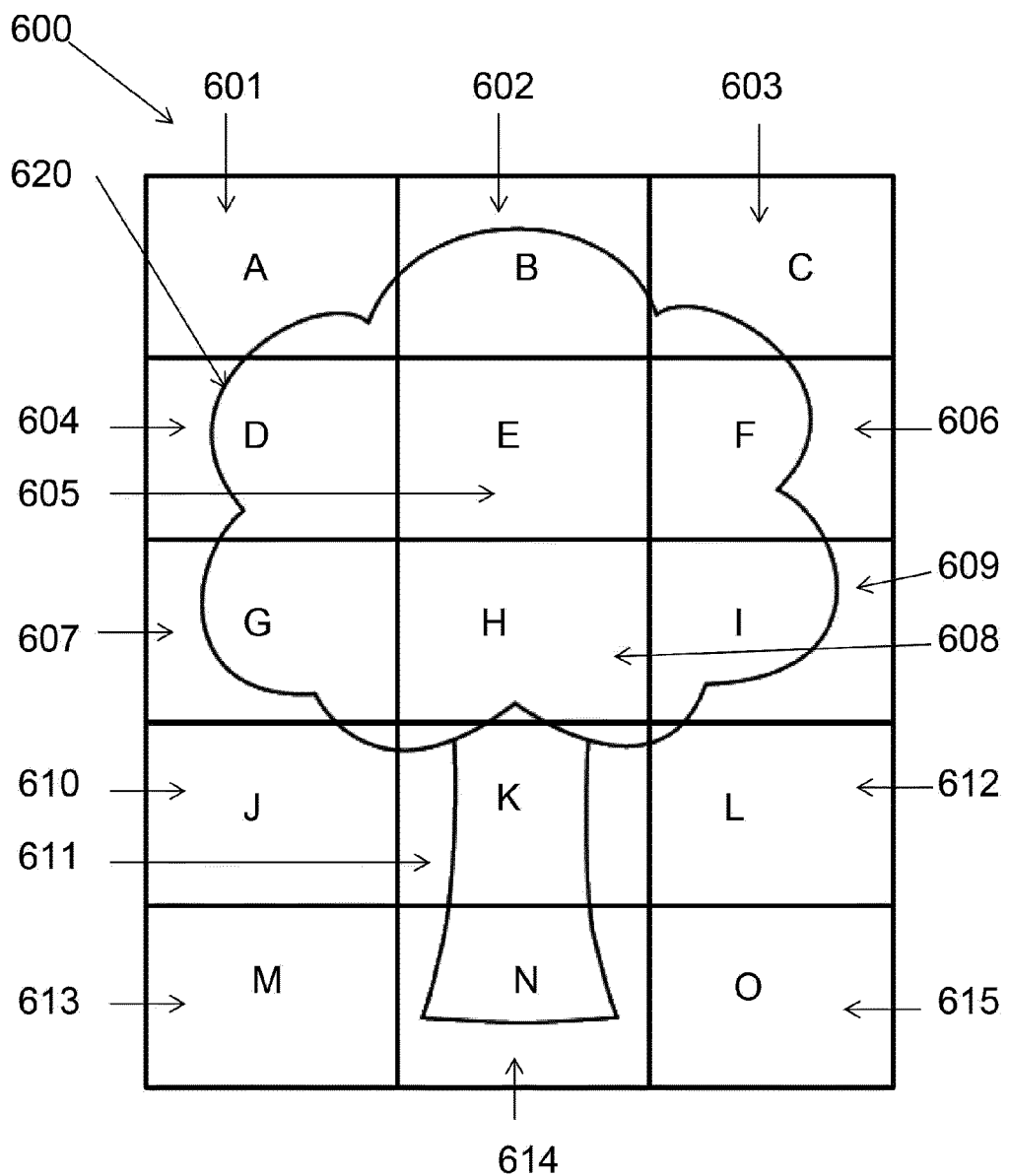
FIG. 9 shows how the image of FIG. 8 is displayed on different tiles of a tiled display device.

This is for instance illustrated by FIG. 8. FIG. 8 shows an image 620 to be displayed on a tiled display device 600 such as the tiled display 600 of FIG. 6. The image 620 is split, for example into (or divided over) 15 blocks as illustrated in FIG. 9. Each of the blocks is assigned to one of the 15 tiles of tiled display 600.

Block A is displayed on tile 601 etc. Table 2 identifies the tile of tiled display 600 which displays a particular block.

TABLE 2

| Tile # (see FIG. 6) | Block |
|---|---|
| 601 | A |
| 602 | B |
| 603 | C |
| 604 | D |
| 605 | E |
| 606 | F |
| 607 | G |
| 608 | H |
| 609 | I |
| 610 | J |
| 611 | K |
| 612 | L |
| 613 | M |
| 614 | N |
| 615 | O |

Figure 10:
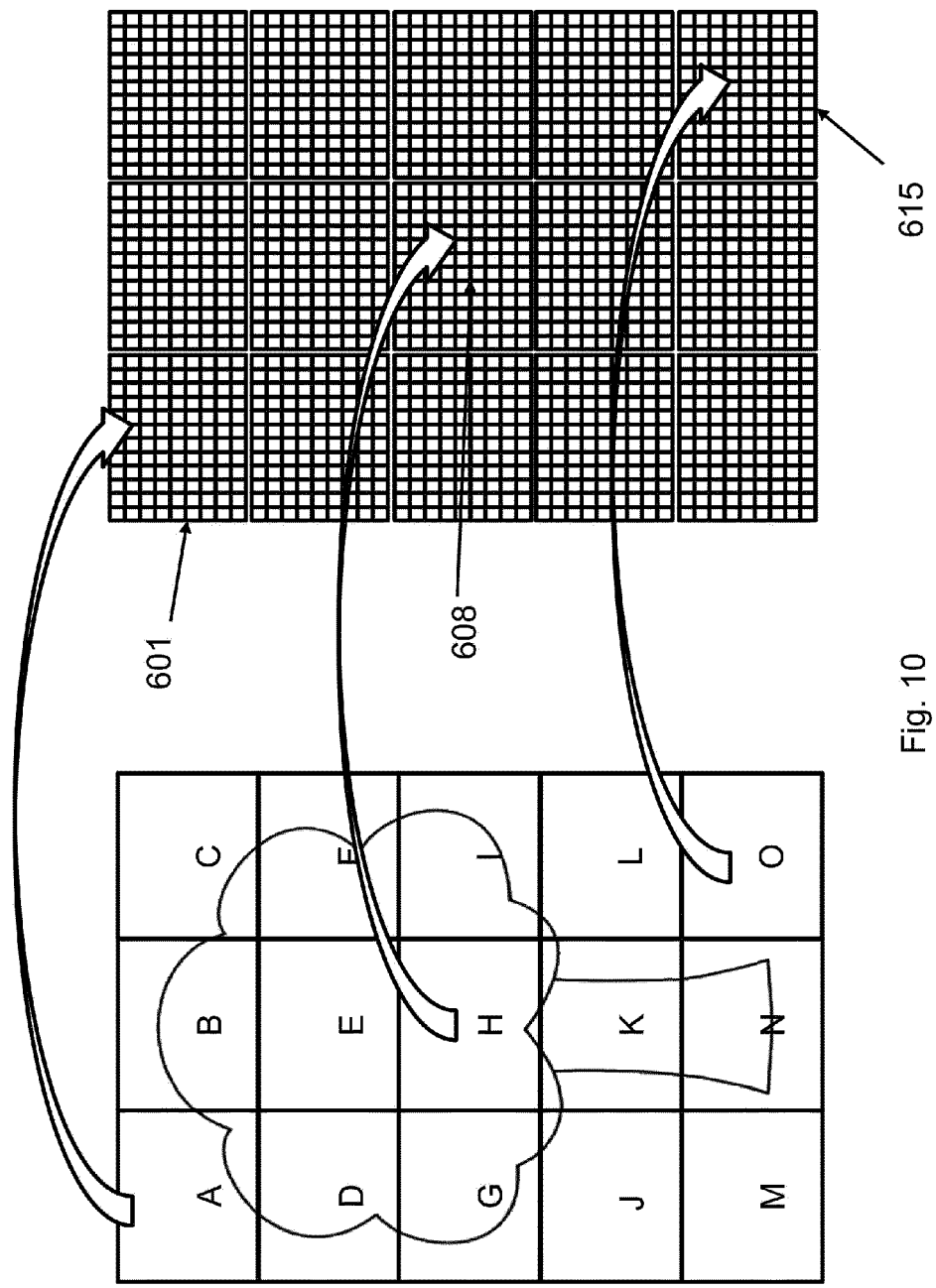
FIG. 10 shows how the image of FIG. 8 is mapped to different tiles of a tiled display device.

FIG. 10 shows for instance block A being assigned to tile 601, block H being assigned to tile 608 and block O being assigned to display tile 615.

The assignment can be done as described in e.g. EP1550947 "Configurable tiled emissive display". The data sent to the display tiles contains information that determines the data to be displayed on the display surface of each tile.

An alternative method 550 according to an embodiment of the present invention is shown in FIGS. 16 to 23. In this embodiment pixels in the first state are turned off so as to be dark or black and pixels in the second state emit "white light" (for those pixels, the Red, Green and Blue LEDs are turned ON e.g. at their maximum intensity). For example for low-brightness and high resolution display tiles (e.g. 800 nit and 1.2 mm pitch), the red brightness per DLED was low making it difficult to determine the center of the DLED's accurately enough, which can impact accuracy of the seam identification. The use of black/white DLED's solved this problem.

Figure 16:
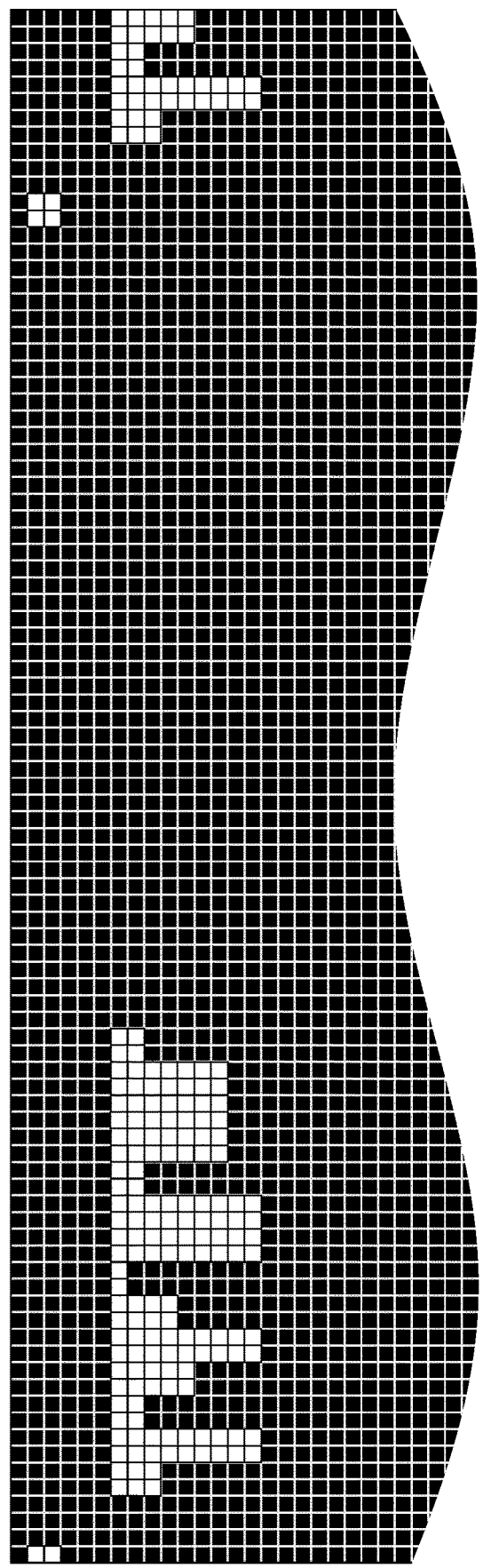
FIG. 16 shows a display tile with white optical ID against a black background with only two DLED's illuminated in the top left hand corner.

Display tiles can be delicate and one of the corners can be broken off as shown in FIG. 16. The top left corner has an optical ID (similar to those described above) shown as white pixels against a black background. Also in the top left corner are two illuminated DLED's and not four as on the right top corner, the four marking a corner. This will disrupt the identification of the corner preventing seam identification and seam calculation.

Also for high resolution tiles, the seam is only a small part of the picture captured by the camera the number of modules that can imaged and processed at once is low because of the low brightness of the red DLED's described above, the difference between black and red being low, in fact much too low to provide a safe distinction.

Figure 17:
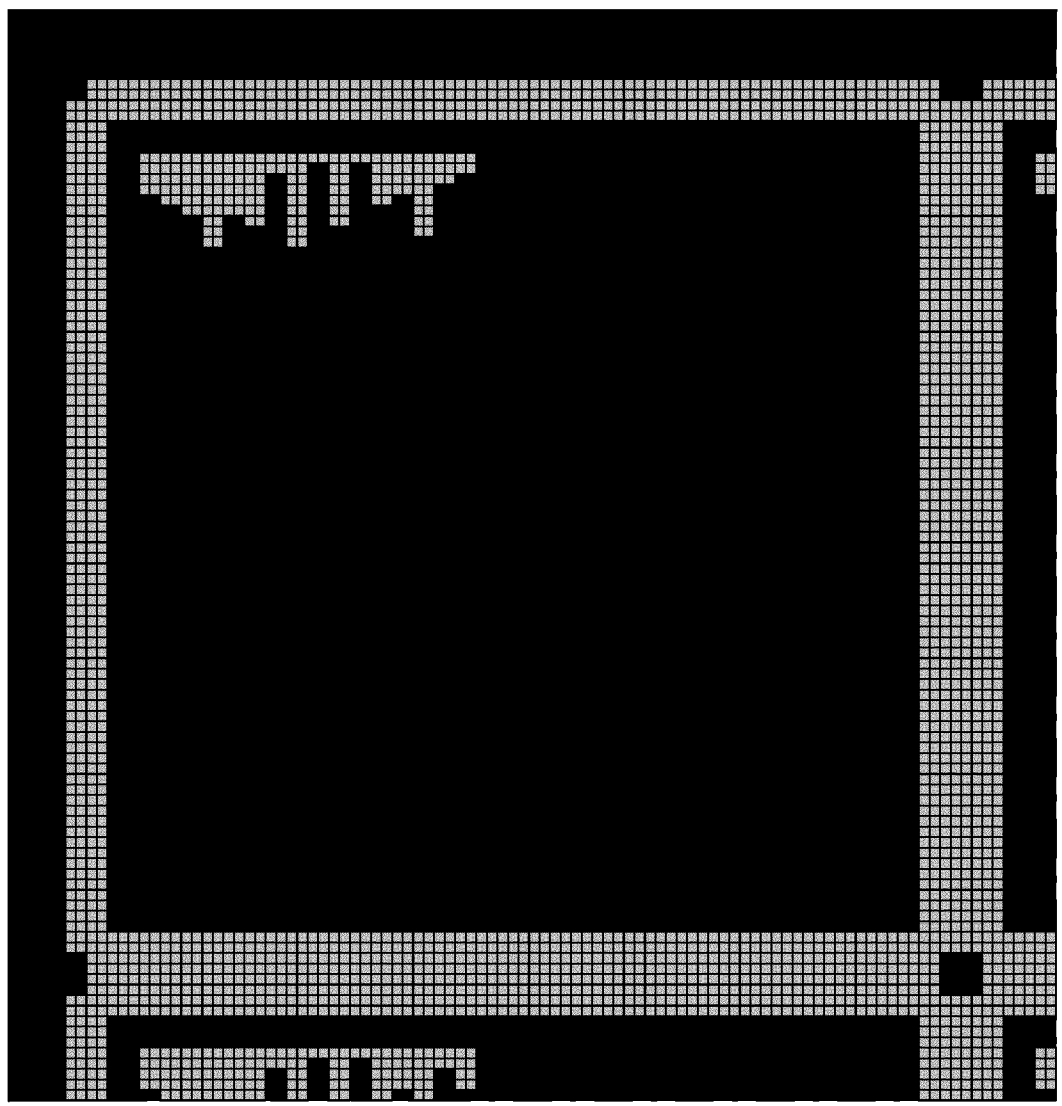
FIG. 17 shows an image of a display tile with white optical ID against a black background with four DLED's set to black top in each corner in accordance with an embodiment of the present invention.

In a first step 552 a different pattern is displayed as shown in FIG. 17. This pattern provides an optical ID, corner and seam points. This is a black and white pattern with the DLED's emitting white light to provide the optical ID and in the background the DLED's are in the OFF state. For the corner points pattern such as 2*2 DLEDs, of each module the DLED's of the corner point pattern are in the OFF-state.

Figure 18:
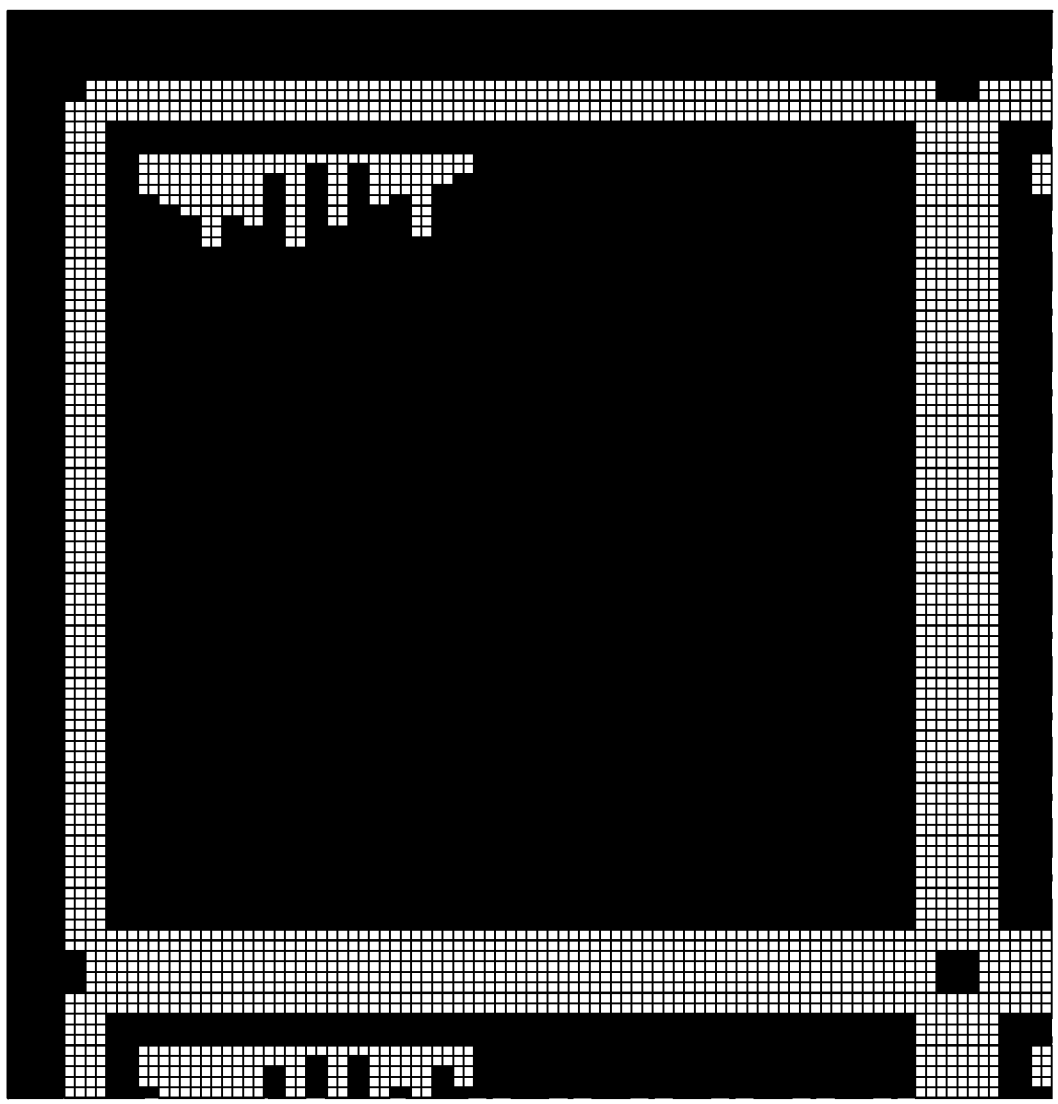
FIG. 18 shows an image of a display tile with white optical ID against a black background with four DLED's set to black top in each corner in accordance with an embodiment of the present invention, whereby all white pixels have been set to maximum white and all black pixels have been set to complete black.

Optionally, in step 554 the image captured by the camera is converted to a black white pattern as shown in FIG. 18. In this step a threshold can be applied to the pixels of picture taken by the camera. All pixels shown on the digital picture 661 that are above a first threshold are set at the maximum intensity white level while pixels below the first threshold are set to black.

Figure 19:
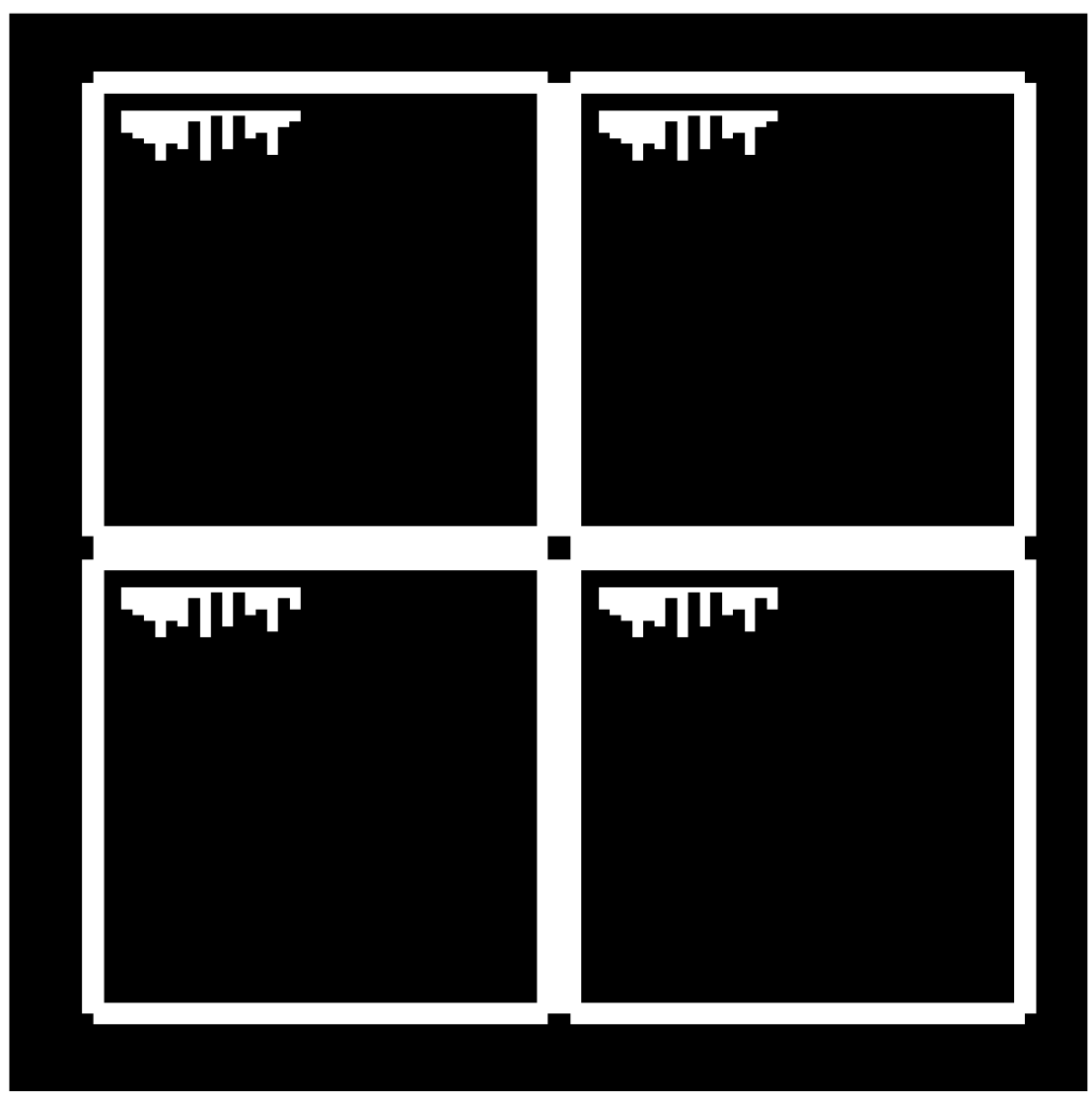
FIG. 19 shows a binary image of the image of FIG. 18.
Figure 20:
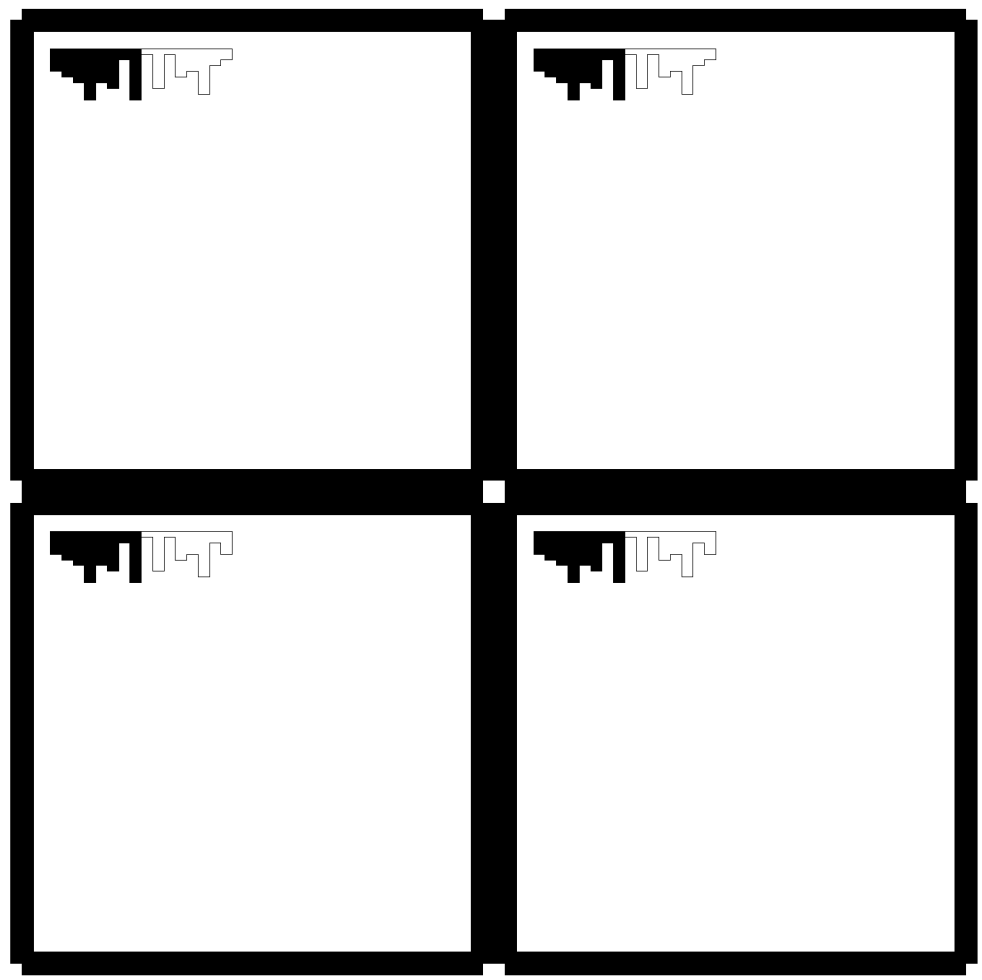
FIG. 20 shows an inverted binary image of the image of FIG. 19.

In step 556 the image 661 captured by the camera is preferably converted to a binary image as shown in FIG. 19. In step 558 the binary image is inverted as shown in FIG. 20.

Figure 21:
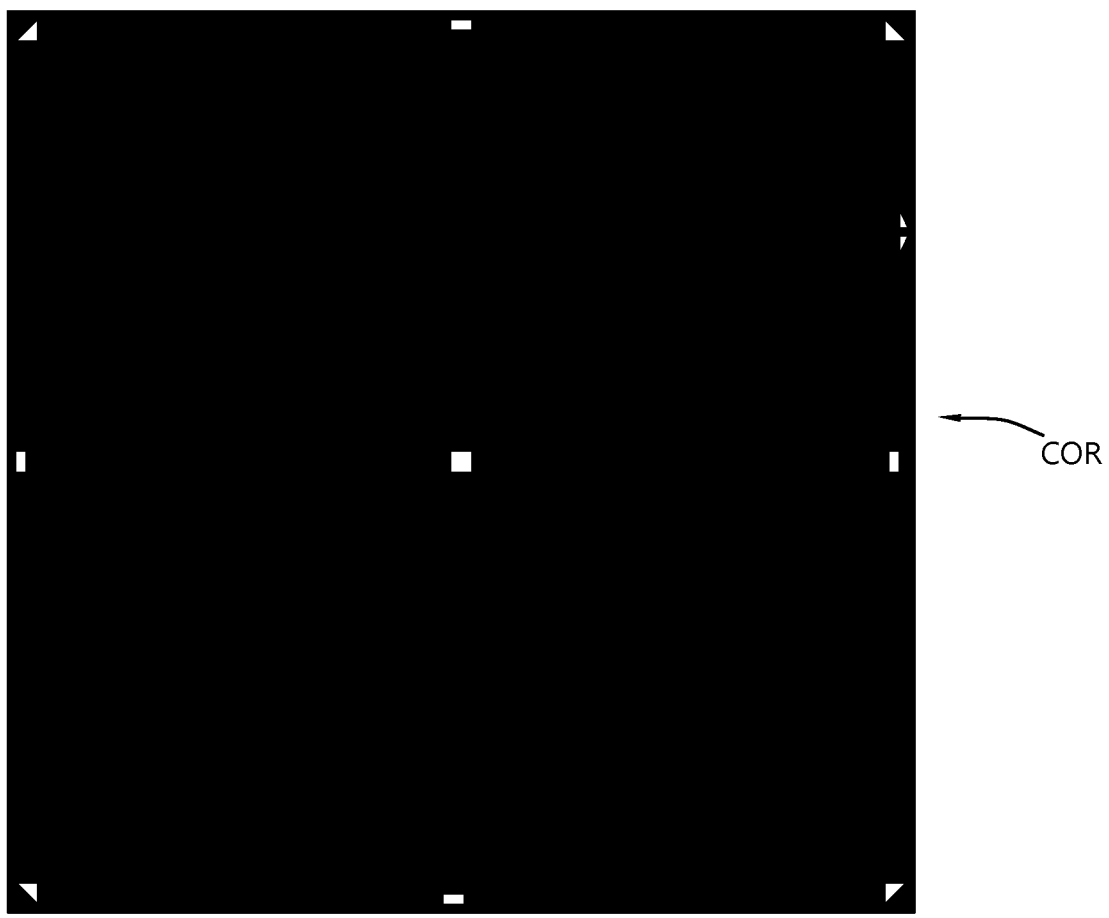
FIG. 21 shows the image of FIG. 20 leaving only the corner markers in accordance with an embodiment of the present invention.
Figure 22:
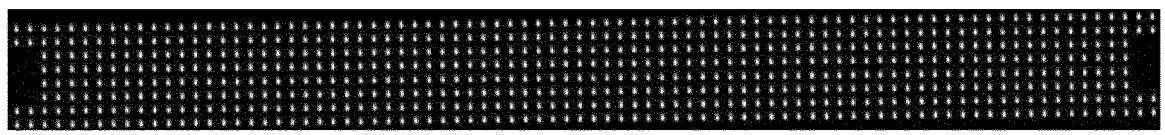
FIG. 22 shows a seam indicated by white pixels on either side of the seam and off pixels to mark a corner.

An advantage of the inverted image is that the corner points (COR) become white independent of whether there is a part of the corner broken off as shown in FIG. 21. For determining the seam, the white DLEDs in the crosshatch-pattern are used which is a similar procedure as when using the red. DLEDs in the embodiment described with reference to FIG. 5. In this image, corner points are isolated and position can be determined. Corner points (see COR in FIG. 21) are used to identify the mechanical seam between two individual modules. In the original picture, there are 4 modules and 4 seams (2 horizontal and 2 vertical seams) and these are analysed individually. FIG. 22 shows the plot of a horizontal seam.

Only the pixels of the tiled display 600 used to display the controllable optical ID number of a tile have a non-zero intensity in the picture 661. In step 560, the relative positions of those pixels are determined in the picture 661 in function of the formats used to encode the digital pictures.

In step 562 the controllable optical ID numbers can be evaluated by additional image processing (e.g. pattern recognition). In this example, a single digit is encoded at the intersection of two lines and one column.

In step 564 a mask is defined, simulating the position of all DLEDS in a display tile comprising DLED module and linked to row and column of the DLED in the module. In step 566 the controllable optical ID is then mapped onto this mask resulting in '0' and '1' and then per line, and the sum is made of all '1's, resulting in numbers.

In step 568 once the relative position of the tiles is known, it is possible to determine which image data must be displayed by a given tile.

The examples above have shown that simple controllable optical identifiers can be used to visually identify display tiles in a tiled display device and determine their relative position within the tile where they are displayed and with respect to other display tiles. In further embodiments of the present invention simple controllable optical markers displayed on the display surface of the display tiles of a tiled display device can be used to derive information concerning seams that can exist between adjacent display tiles.

Figure 11:
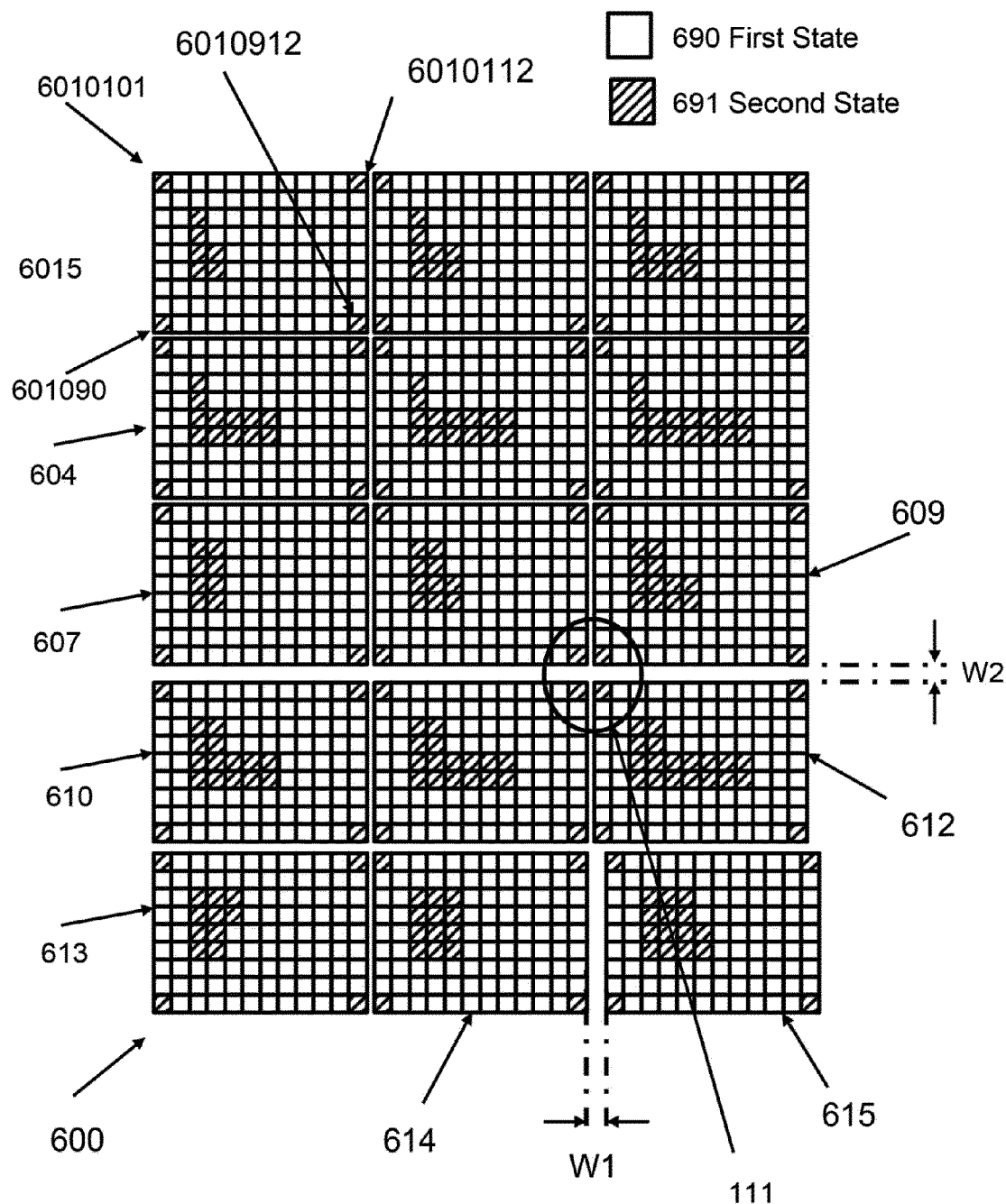
FIG. 11 shows a tiled display device displaying controllable optical IDs and optical seam markers (edge patterns) with variable seam width according to any of the embodiments of the present invention.

FIG. 11 shows a tiled display device 600 as shown in FIG. 6 but with varying seam widths between display tiles. The seam W between two display tiles can vary across the tiled display device 600 as illustrated on FIG. 11.

The seam W1 between display tiles 614 and 615 is not the same as e.g. between display tiles 613 and 614.

The seam W2 between display tiles 609 and 612 is not the same as e.g. between display tiles 612 and 615.

Controllable optical markers can be used to assist in the identification and evaluation of the seam between two adjacent display tiles across the tiled display device 600.

The controllable optical markers are patterns displayed on the display surface of a display tile. In the example of FIG. 11, the controllable optical markers are single pixels in some or all corners of each display tile hence marking the end of a seam. The pixels; like e.g. pixel 6010101 (top left corner of display tile 601), pixel 6010112 (top right corner of display tile 601), pixel 6010901 (bottom left corner of display tile 601) and pixel 6010912 (bottom right corner of display tile 601); are set in a third state. This third state can be different from or the same as the second state as was described above with respect to the case for the pixels used to display the controllable optical identifier of display tile 601.

The other pixels (e.g. the pixels that are used neither as marker nor to display a controllable optical ID number) are set in a fourth state. This fourth state can be different from or the same as the first state as was described above with respect to the case for the pixels used to display the controllable optical identifier of display tile 601.

As previously, when the pixels are triplets of RGB DLEDs, the fourth state e.g. the first state can be a state in which the pixels are set to a native color like Red, Green or Blue and the third state e.g. the second state can be a state where the pixels are set to white.

As was done previously, a digital picture of the tiled display can be taken with a monochromatic or colour digital camera when each display tile displays the controllable optical markers. This can be done while the tiles display their controllable optical identifier (ID) as is represented on FIG. 11.

Figure 12:
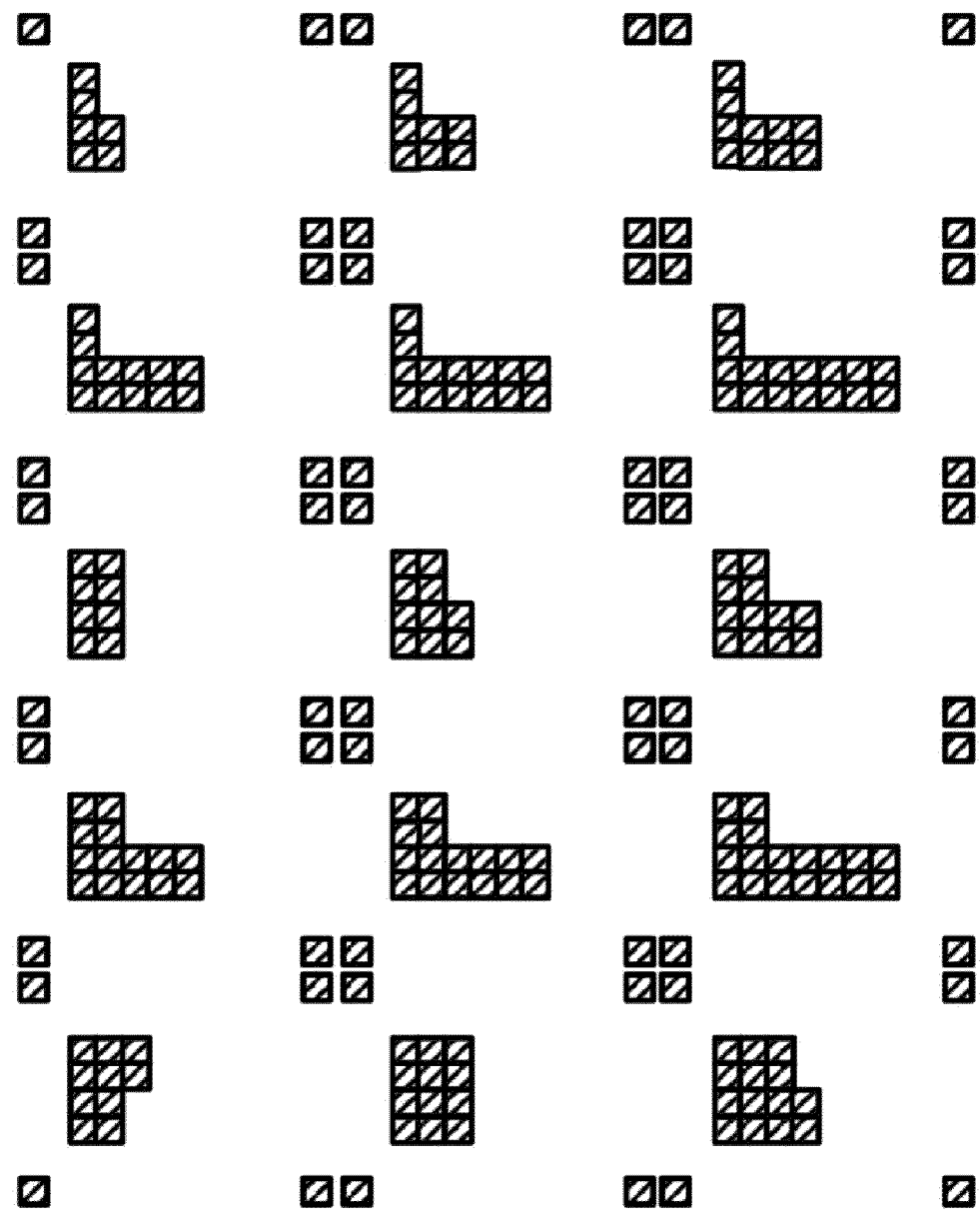
FIG. 12 shows the result of filtering and thresholding a digital picture of the tiled display of FIG. 11 taken with a monochromatic or a color camera according to any of the embodiments of the present invention.

FIG. 12 shows the result of filtering and thresholding a digital picture of the tiled display of FIG. 11 taken with a monochromatic or a color camera.

Figure 13:
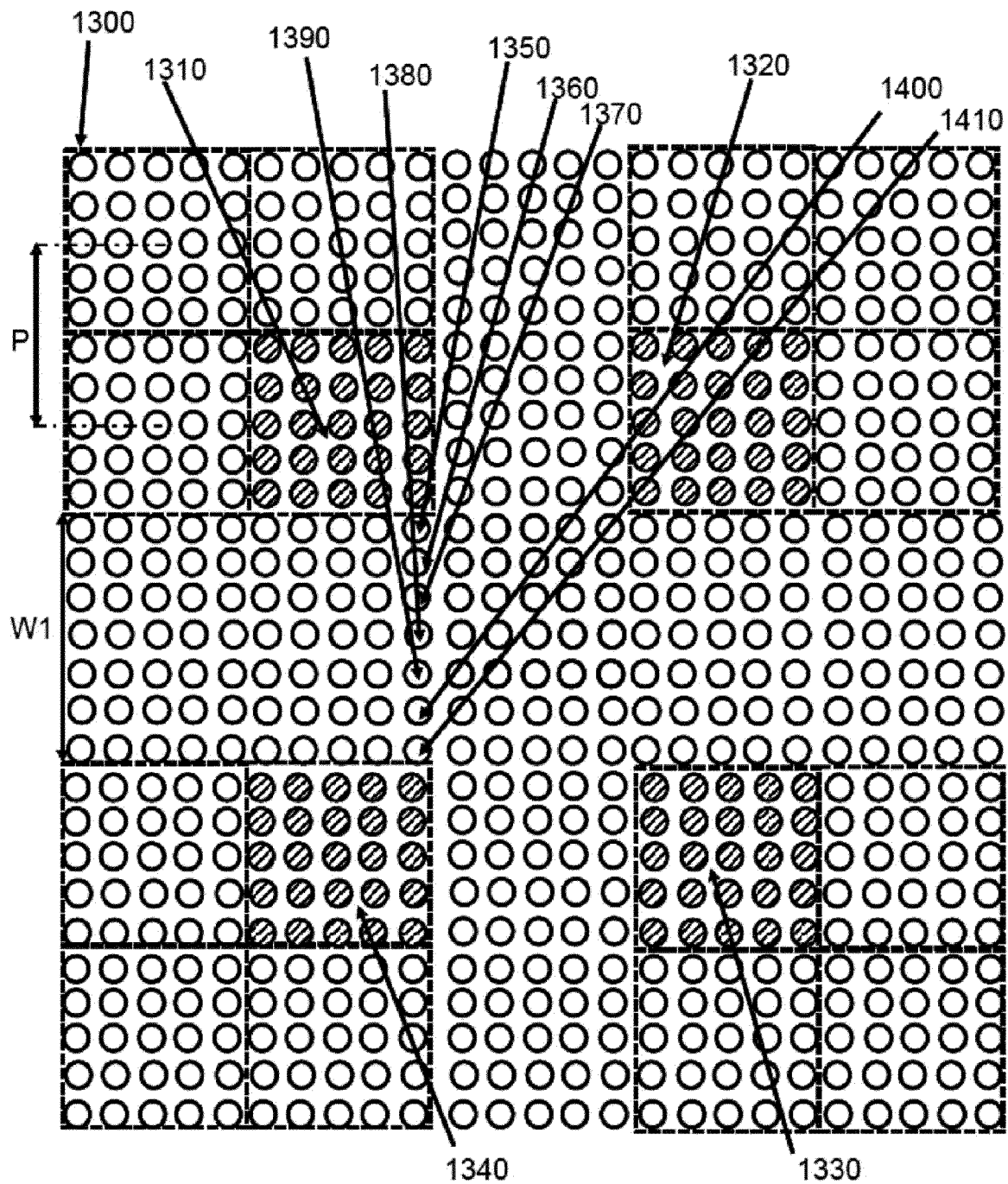
FIG. 13 shows pixels of a digital photograph of a tiled display device with variable seam width according to an embodiment of the present invention.

FIG. 13 corresponds to the inside of circle 111 on FIG. 11. In FIG. 13, each small circle like 1300 corresponds to a pixel of the processed digital picture. The squares represented in FIG. 13 correspond to the boundaries of a pixel of the display device 600. In this example, one pixel of the DLED display corresponds to a square of 5×5 pixels on the digital picture shown in FIG. 13 as 5×5 circles either hatched or clear. For instance:

The controllable optical marker in the bottom right corner of tile 608 corresponds to the group 1310 of 5×5 pixels on the digital picture;

The controllable optical marker in the bottom left corner of tile 609 corresponds to the group 1320 of 5×5 pixels on the digital picture;

The controllable optical marker in the top right corner of tile 611 corresponds to the group 1340 of 5×5 pixels on the digital picture;

The controllable optical marker in the top left corner of tile 612 corresponds to the group 1330 of 5×5 pixels on the digital picture.

The seam between tiles 608, 609, 611 and 612 can be evaluated based on the number of pixels on the digital picture that separate the controllable optical markers which indicate the ends of seams.

For instance, the seam W1 between tile 608 and 611 is 7 (seven) digital picture pixels wide while the seam W2 between tile 608 and 609 and between tile 611 and 612 is 5 (five) digital picture pixels wide. Evaluating the seams is done by merely counting the digital picture pixels between the groups of digital picture pixels which have received optical signals from the markers displayed on the display tiles.

For instance, evaluating the seam W2 between tiles 608 and 611 is done by counting the digital picture pixels 1350, 1360, 1370, 1380, 1390, 1400 and 1410 between the lowest border of the group 1310 of 5×5 black digital picture pixels and the highest border of the group 1340 of 5×5 black digital picture pixels by image processing.

In the example of FIG. 13, the seam W2 is larger than the pixel pitch P (the distance between the centers of two adjacent display pixels). Indeed, if the seam W between adjacent tiles is different from the display pixel pitch, it can give rise to visual artifacts.

Once the seam between two adjacent display tiles is known, if it is found to be different from P, it is possible to correct for it. For this purpose it is preferred if the number of digital picture pixels in the camera which relate to one pixel of the display tile are at least 3, preferably 5 or more, and preferably 10 or more up to 60. As better cameras are produced this number can be increased.

To be able to correct for seam variations, the resolution of the camera with which the seam is evaluated must be good enough. Experiments carried out with a Cannon camera MODEL CANON 5D mark IV or CANON DSDR and a tiled display R-series, R7, 7 mm product, 36*54 led per module supplied by Barco NV Belgium show that 3 to 5 digital picture pixels per display pitch P would be a minimum. More is preferred.

The number of camera pixels horizontally and vertically divided by the 'picture pixels per display pitch P' (minimal 3, but better is 5 or more, better is 10 or more or up to 60) gives the maximum number of DLEDs in horizontal and vertical direction that can be photographed. The number of pixels horizontal and vertical are divided with the number of DLEDs on a tile (e.g. 144*144) to get the number of controllable optical IDs that can be in a single digital picture.

Let us take a digital camera with a resolution of 2240× 1680 pixels (4M pixel camera).

Let us take a LED display like the X2 from Barco NV, Belgium: each tile is 0.4 m by 0.4 m with a pixel pitch of 2.7 mm (i.e. 360 pixels per meter). One tile has thus 144 lines of 144 pixels each.

A tiled display as that of FIG. 6 would thus have a total display surface of 2 m×1.2 m and a total number of pixels equal to 720×432=311040 pixels.

If the field of view of the camera is filled with the tiled display, each pixel of the display will be "covered" by a cluster of 12 pixels which translates to 3 to 4 camera pixels or picture pixels per display pixel pitch P. With this camera, it is thus possible to characterize the seam with a precision of +/−30% of the pixel pitch. If the picture is expanded (enlarged) locally, a better precision can be obtained but more pictures may be necessary.

If the resolution of the digital camera is increased beyond 20 M pixels, in the same conditions, each pixel of the display will be "covered" by a cluster of 60 pixels or more.

If the number of camera pixels per display pixel is deemed insufficient for a given type of electronic seam compensation technique, it is possible to take a picture of part of the tiled display only. Thanks to the ID number of each tile being available on the digital picture, it is easy to reconstruct a full picture of the tiled display with the required number of camera pixels per display pixel.

For instance, with the 4M pixel camera it is possible to cover each display pixel with 24 to 36 camera pixels by taking 3 pictures of the tiled display, each of the pictures being taken from closer to the tiled display or with a zoom and each picture being filled with +/− one third of the tiled display.

Figure 14:
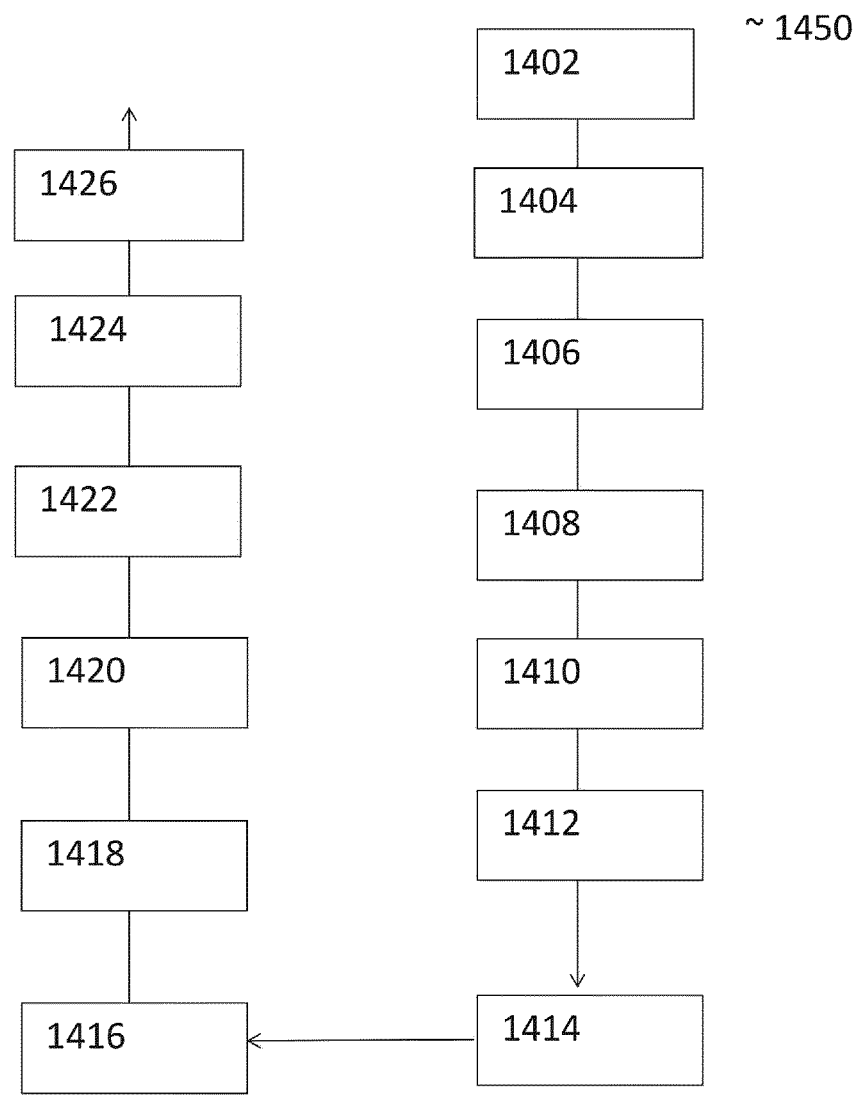
FIG. 14 shows a further method of calibrating a tiled display device in accordance with an embodiment of the present invention.

A method 1450 according to an embodiment of the present invention is shown in FIG. 14. In step 1402 a complete setup of the display system is performed including positioning, and a first calibration.

In step 1404, a connection is made to a display manager to prepare display for camera based seam compensation. The display manager can be provided by suitable Display Management hardware/software such as for instance related to NM100 supplied by Barco NV. The Display Management hardware/software can provide a web interface that allows users to access information in the display hardware and offers tools to view and manipulate settings on the hardware.

The hardware can be a processor of the type for example like an Infinipix™ processor (e.g. NP100 supplied by Barco NV, Belgium) and a number of receivers such as Infinipix™ receivers (e.g. NR100—supplied by Barco NV) that can be integrated into the actual display cabinets.

In step 1406 a display description file can be downloaded from the Display Management hardware/software such as for instance of the kind NM100 supplied by Barco NV Belgium, to an electronic digital processing device such as a computer, a laptop, a tablet, a smartphone, a PDA or similar. This description file contains the required information for seam compensation tools.

In step 1408, the luminance of an internal pattern is set, e.g. ID and seam markers.

In step 1410 "Optical ID"-pattern is set, e.g. to a first colour such as white or red and also each tile ID and seam information. The background can be set to a suitable colour such as red or white or dark such as black. The Optical ID can be coded using illuminated pixels such that for example, the code is displayed only to represent numbers. One or two identical vertical lines of pixels can be illuminated per number, whereby the second line if present acts as a backup. In this case the number of illuminated pixels in the height can be equal to the required number+1.

The optical ID is used to identify the display tile and link the calculated seam compensation data to the correct display tile in the following steps.

In step 1412 a remote session can be started by optionally making a connection from the electronic digital processing device such as a computer, a laptop, a tablet, a smartphone, a PDA or similar to a server which can be in the cloud. A wireless 4G connection can be used for this when the display is in a remote location. Alternatively a local session may be carried out alone on the local electronic digital processing device such as a computer, a laptop, a tablet, a smartphone, a PDA or similar.

In the local session or remote session with the server, a display description file may be requested.

In step 1414 a monochromatic or colour digital camera is connected to the electronic digital processing device such as a computer, a laptop, a tablet, a smartphone, a PDA or similar and any camera software can be installed if it has not been preinstalled. In the local session or remote session with the server the taking of a digital picture with the camera is requested whereby the digital picture includes at least one Optical ID. In the local session or remote session with the server the picture is stored, e.g. in a memory on the electronic digital processing device such as a computer, a laptop, a tablet, a smartphone, a PDA or similar or on the server.

In step 1416 a software process running on a microprocessor on the electronic digital processing device such as a computer, a laptop, a tablet, a smartphone, a PDA or similar or on the server verifies if the picture is clear e.g. there are no obstructions between camera and display. This verification can also be done by an operator.

Optionally, the picture can be uploaded from the local electronic digital processing device such as a computer, a laptop, a tablet, a smartphone, a PDA or similar to the server In step 1418 a software process running on a microprocessor on the electronic digital processing device such as a computer, a laptop, a tablet, a smartphone, a PDA or similar or on the server verifies if the picture quality and also determined if the picture contains at least one tile optical id and preferably verifies that there is a plurality of optical IDs. This verification can also be done by an operator. If any of the verifications fails the electronic digital processing device such as a computer, a laptop, a tablet, a smartphone, a PDA or similar or the server can request a retry.

In step 1420 a software process running on a microprocessor on the electronic digital processing device such as a computer, a laptop, a tablet, a smartphone, a PDA or similar or on the server shows graphical information on what data was already received. In case the complete display is too big to gather all seam info in one camera picture a software process running on a microprocessor on the electronic digital processing device such as a computer, a laptop, a tablet, a smartphone, a PDA or similar or on the server requests to position the camera to take a picture of the next part of the display. This request can be initiated by an operator.

The camera is repositioned or this step is terminated if no further pictures of the rest of the display are to be made. A software process running on a microprocessor on the electronic digital processing device such as a computer, a laptop, a tablet, a smartphone, a PDA or similar or on the server can be configured to detect that all necessary pictures have been uploaded since we the display description file has been uploaded in step 1402.

After each picture has been uploads, in step 1422 a software process running on a microprocessor on the electronic digital processing device such as a computer, a laptop, a tablet, a smartphone, a PDA or similar or on the server shows an overview report with the display tiles that have correct camera information. Displays tiles can be reported as ok, e.g. at least one or two pictures are valid. Display tiles can be reported as not identified or have no pictures uploaded. Display tiles can be reported as having invalid seam pattern pictures.

Once all pictures are uploaded, in step 1424 a software process running on a microprocessor on the electronic digital processing device such as a computer, a laptop, a tablet, a smartphone, a PDA or similar or on the server processes all pictures and calculates the necessary seam corrections such as seam compensation factors for each of the seams. The calculation software can be bundled in a package that the user can download to the electronic digital processing device such as a computer, a laptop, a tablet, a smartphone, a PDA or similar or to the server.

in step 1426 a software process running on a microprocessor on the electronic digital processing device such as a computer, a laptop, a tablet, a smartphone, a PDA or similar stores the seam corrections such as seam compensation factors or downloads the seam corrections such as seam compensation factors from server to the electronic digital processing device such as a computer, a laptop, a tablet, a smartphone, a PDA or similar. A connection is made with the Display Management software/hardware and a correction or compensation file is uploaded to the Display Management software/hardware. Display Management software/hardware uploads the seam corrections or compensations to the display tiles.

Manual seam compensation or correction can be provided as an option. Also manual compensation or correction may be combined with step 1426, e.g. manual correction may be provided a fine compensation or correction after a first compensation or correction has been carried out by the Display Management software/hardware uploading the seam corrections or compensations to the display tiles.

Figure 24A:
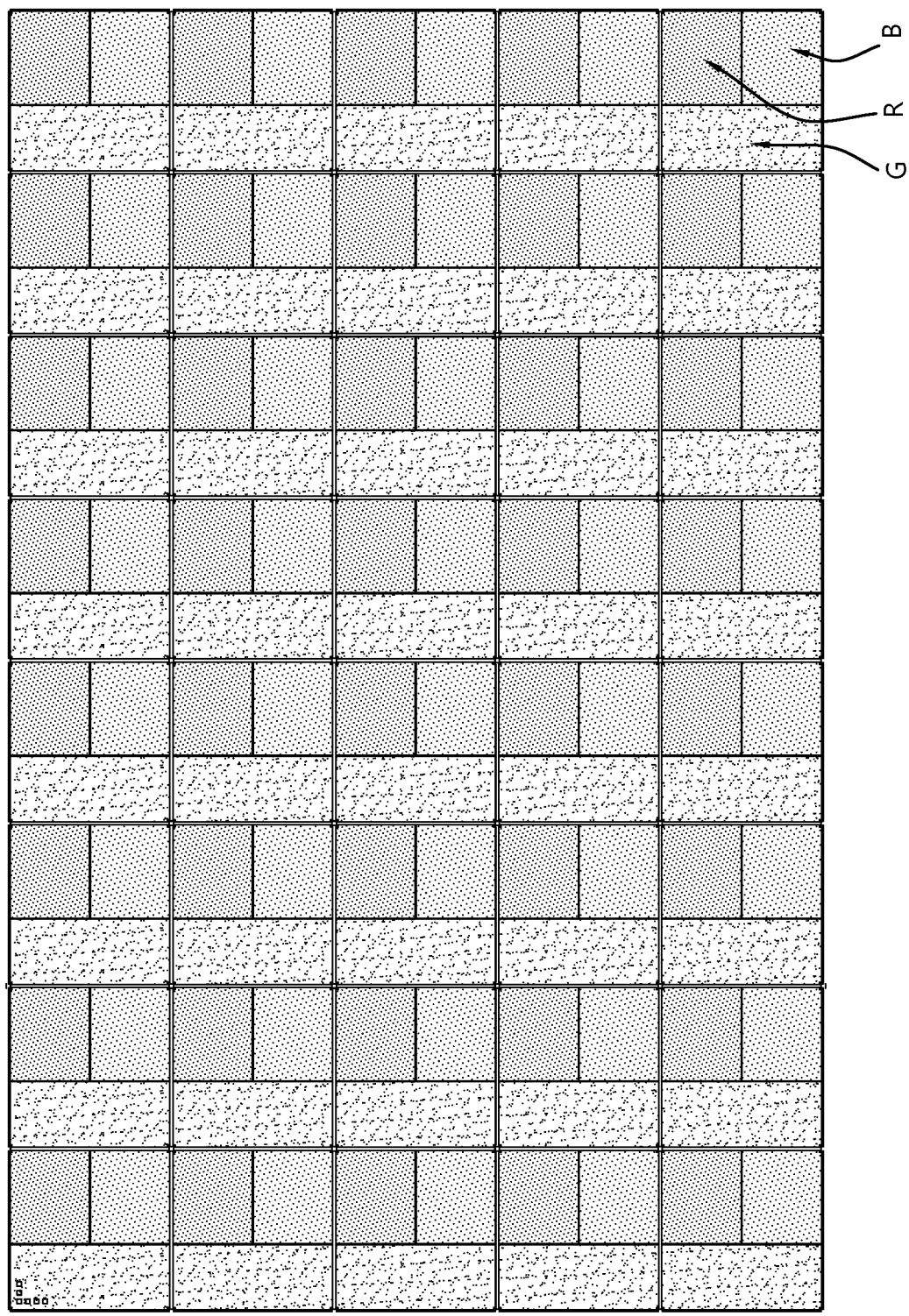
FIG. 24A shows a camera picture of 48 modules driven to show one red, green and blue section (RGB) per module and one optical ID per camera picture in accordance with an embodiment of the present invention.
Figure 24B:
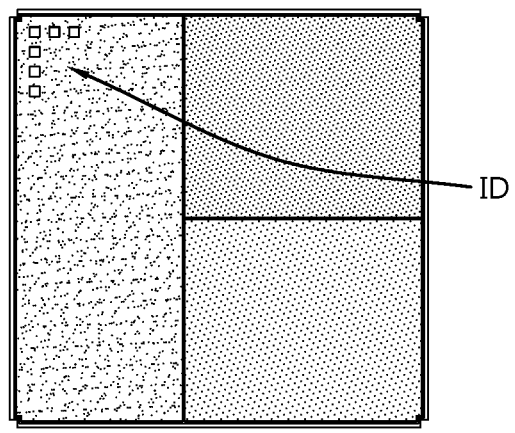
FIG. 24B shows a detail of an optical ID of 6 DLED's which are OFF in accordance with an embodiment of the present invention.

Embodiments of the present invention also include FFC (=Fast Field Calibration), e.g. to obtain brightness compensation in the field to get better uniformity of brightness. The purpose of FFC is to correct the brightness differences of Red, Green and Blue at the module level, preferable by taking 1 picture only. As already mentioned the display can be driven to provide various types of markers via displayed patterns, e.g. to provide a module optical ID. In this embodiment corner points of the modules are in the OFF-state. Also an Optical ID can be displayed as explained above. Such a marker or optical ID can be located in the corner of the image, whereby one optical ID-pixel can comprise 3*3 DLEDs. The DLEDs are preferably in the OFF-state. Only 1 optical ID per camera picture is required instead of 1 optical ID per module as described above. The optical ID is used (by image processing) to identify the number of the picture and position of the modules relative to the position of the optical ID on the camera picture. Red, green and blue patterns (RGB) can be displayed per module as shown in FIG. 24A. FIG. 24A shows one camera picture comprising 8 by 6=48 modules with one optical ID in the top left corner of the picture. Each module has one green one blue and one red field (RGB). One optical ID is displayed per camera picture in accordance with this embodiment of the present invention. FIG. 24B is an enlargement of FIG. 24A showing one module which contains an optical ID of 6 DLED's which are OFF in accordance with a preferred version of this embodiment of the present invention.

Figure 25:
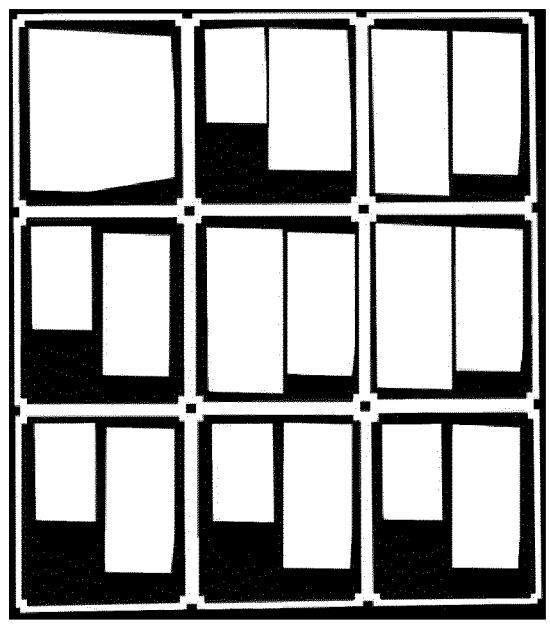
FIG. 25 shows a black white image of the image of FIG. 24.
Figure 26:
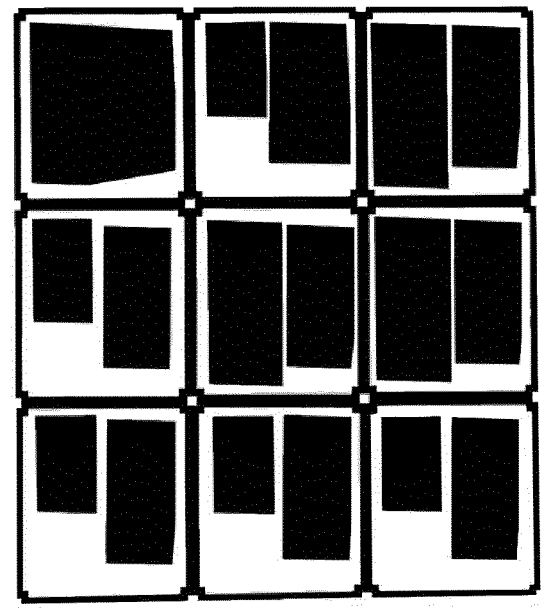
FIG. 26 shows an inverted binary image of the image of FIG. 25.

From the camera picture an average of the brightness of the DLEDS can be determined per colour. It is preferable, if no individual DLEDs can be discerned in the camera picture, i.e. that sufficient modules are photographed with one camera picture so that the resolution of the camera is not sufficient to identify one DLED of the display tile. A green crosshatch pattern can be is used only to display and determine the corner points, because a black white image can be produced from the green fields. This allows production of a binary image as shown in FIG. 25. This can be inverted resulting in black corner points becoming white as shown in FIG. 26.

Figure 15A:
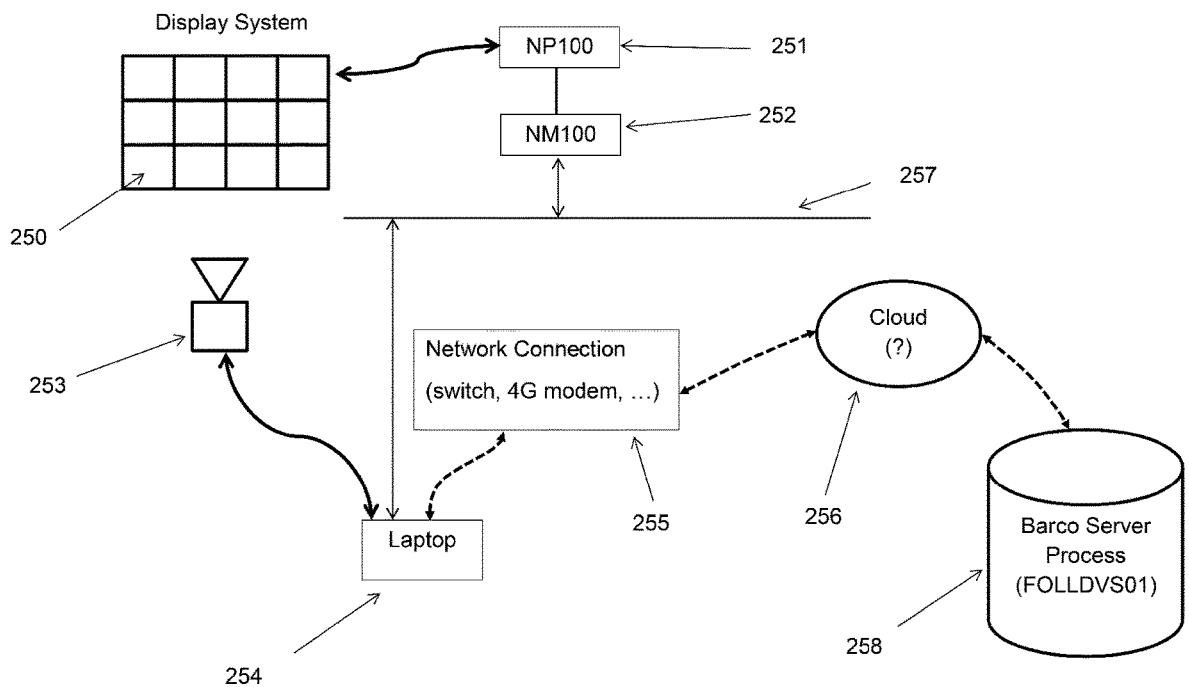
FIGS. 15A and 15B show networks including a tiled display device in accordance with embodiments of the present invention.
Figure 23:
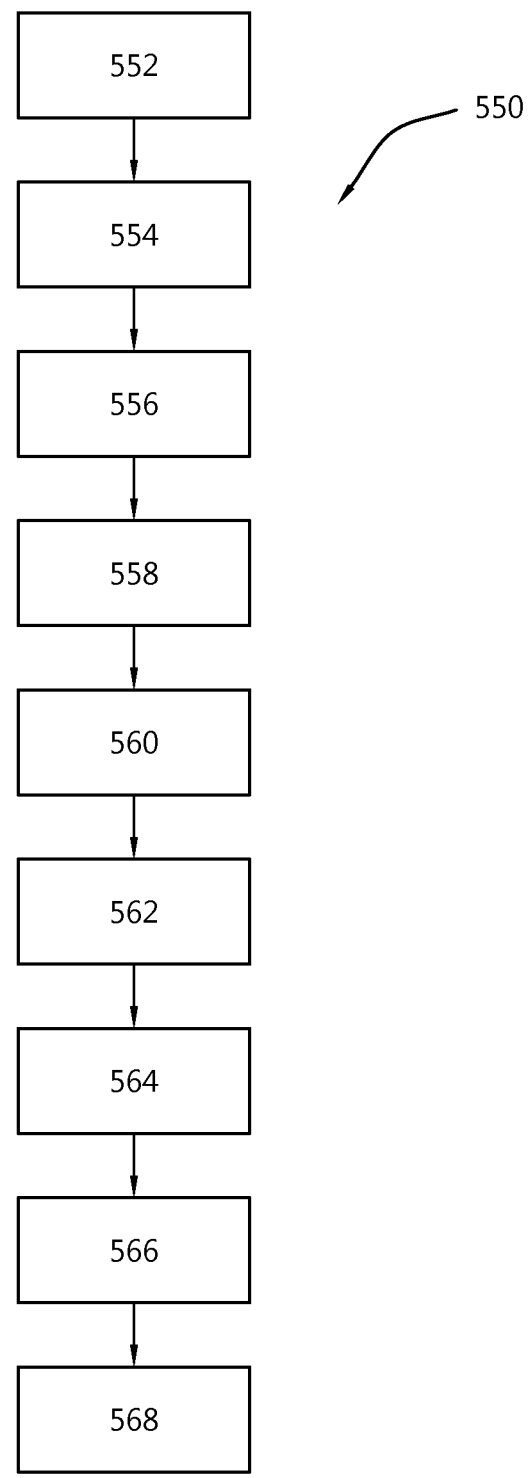
FIG. 23 shows another method of calibrating a tiled display device in accordance with an embodiment of the present invention.

Arrangements for carrying out the methods of FIG. 5 or 23 or FIG. 14 are shown in FIGS. 15A and B. Both of these arrangements include a tiled display device 250, operatively connected to a processor 251, and to a Display Management hardware/software 252, which in turn is connected for example to a local area network 257, as well a digital camera 253 either monochromatic of colour, connected to a digital electronic processing device 254 such as a laptop, a palmtop, a PDA, a smartphone, a personal computer, tablet, a workstation, or similar, or a digital electronic processor device can be embedded in some other device. The arrangement of FIG. 15A and FIG. 15B may include the arrangements of FIG. 1 and/or FIG. 2 which are expressly here incorporated into these disclosures. FIG. 15A shows optionally a network connection 254, optionally a cloud 256, and optionally a cloud server 258 which is capable of carrying the picture analysis or the digital electronic processing device 254 is capable of that. The camera 253 can be optionally connected to the cloud, via an intermediate connection 255 and through the digital electronic processing device 254. Taking of the digital picture can be done via camera software executed on the on the digital electronic processing device 254. The cloud server 258 can be configured to request upload of the digital picture(s). A display device update and/or correction package can be downloaded from server 258 and can be uploaded to the display system including the tiled display device 150, the processor 251, the Display Management hardware/software 252. As well as seam hiding, FFC (=Fast Field Calibration), can also be carried out e.g. brightness compensation in the field get better uniformity of brightness.

Figure 15B:
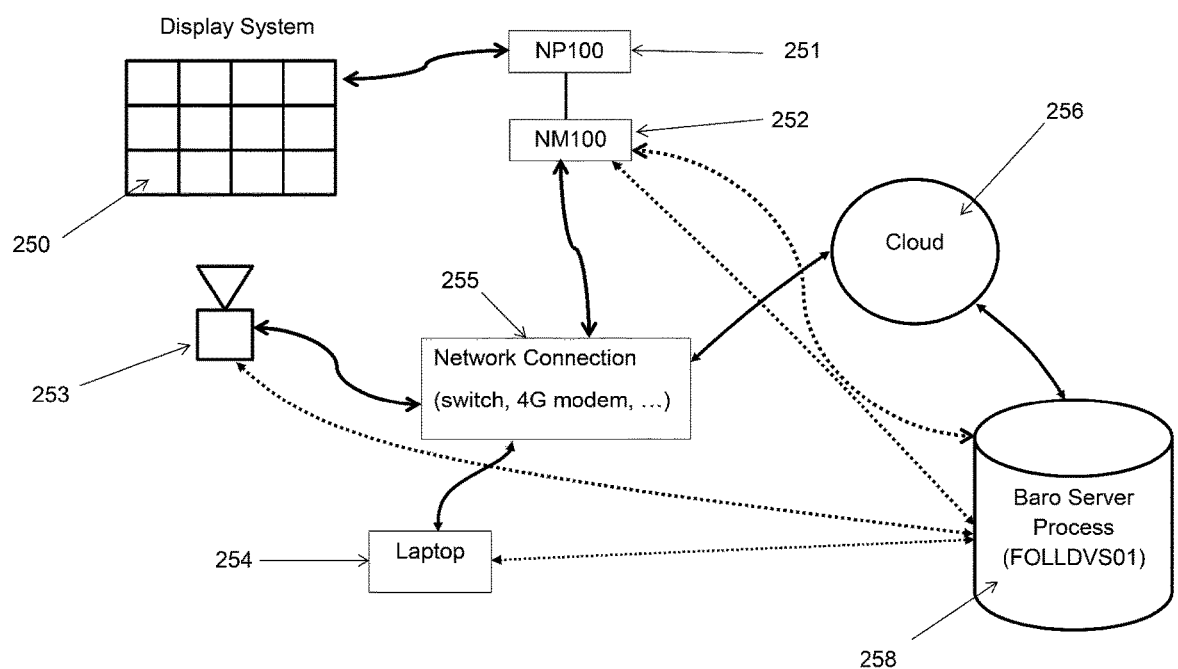

In addition FIG. 15B shows a fully network connection 254, a cloud 256, and a cloud server 258 which is capable of carrying out the picture analysis. The complete process can be driven from the cloud server 258 whereby the cloud server has direct connection to the camera 253 to take digital pictures and to upload these to the server 258 for analysis. The cloud server 258 can be configured to update and/or correct the operation of the display device 250. As well as seam hiding FFC (=Fast Field Calibration), can also be carried out e.g. brightness compensation in the field get better uniformity of brightness.

Visibility of seams can occur for a number of reasons. One cause of visibility of the seams is the change in pitch between pixels of neighbouring tiles compared to the pitch between pixels of one tile, which is amongst others determined by the alignment of the display tiles. The seam appears as a dark line if the gap between display tiles increases the pitch between individual light sources (e.g. LED's) or pixels at the edge of neighbouring tiles compared to the pitch between individual light sources or pixels within one tile. The seam appears as a bright line at the crossing between display tiles, if the gap between display tiles decreases the pitch between individual light sources (e.g. DLED's) at the edge of neighbouring tiles compared to the pitch between individual light sources or pixels within one tile. In the first case the brightness at the mechanical connection of the display tiles decreases, in the second case the brightness increases. Another cause of visibility of seams between tiles may be the presence of environmental or stray light, e.g. incident on the backside of the tiled display and guided through the seams in the viewing direction.

Summarizing the above, an aspect of the present invention relates to a method or system of analyzing images from a tiled display device and for adjusting displaying of an image on the tiled display device. According to embodiments of the present invention, the method is adapted for adjusting the displaying of an image on a display system so as to reduce the influence of a perceived display non-uniformity, e.g. by optical camouflaging or hiding of a seam. Embodiments of a method or a system according to the present invention can be adapted for reducing the optical influence of seams on the visualization of images displayed on a display device. The difficulty of concealing a seam is influenced by the size of the seam and the distance of the viewer from the display. One way to compensate for a non-lit seam is to increase the brightness of display pixels on either side of the seam. The brightness and potentially the number and extent of pixels on either side of the seam that are increased in brightness depend upon the width of the seam. Alternatively a seam may be brighter than the rest of the display device, e.g. a light such as the sun may be visible through seams from the back of the display device. In that case one way to compensate for a lit seam is to decrease the brightness of display pixels on either side of the seam.

In both cases a camera digital picture of the display device can be captured wherein controllable optical ID's and seam markers (edge patterns) are visible. The camera digital picture can be analysed by an analysis unit to measure the brightness emitted within the seam. From the width of the seam and the darkness (or brightness) of the seam area, the brightness can be adjusted of illuminated DLEDs on either side of the seam according to a suitable mathematical rule. For example a first average can be calculated of the seam and areas on either side of the seam and the brightness of the seam. The method can start with the first average being raised by increasing (or decreasing) the brightness on either side of the seam until it is the same as a second average of the brightness on either side of the seam not including the seam before any adjustments are made. Alternative blending algorithms can be used to reduce the effect of the seam. For example a mathematical function may be selected other than a simple average. Alternatively blending may be performed manually. For example, the digital picture from the camera can be displayed on a monitor and an operator may manually blend over the seam areas especially the most prominent ones.

In accordance with any of the embodiments of the present invention, the disturbing effect of noticeable seams created by the spacing between tiles can be successfully camouflaged by modifying light emission characteristics in a region adjacent to the seams or by generating patterns coinciding with the seam's width. The thesis "Evaluating and Improving Image Quality of Tiled Displays" by Steven McFadden, University of Waterloo, Canada 2015 describes how to hide seams and evaluates 6 different correction algorithms, and is incorporated herein by reference. One method of reducing dark or black seam visibility is edge brightening, whereby the dark region of the seam is compensated by increasing the intensity of adjacent active pixels. In the case of bright seams edge dimming can be applied in the same way except reducing brightness of pixels of adjacent to the seam is used. Edge brightening or dimming can make use of the Point Spread Function (PSF) of the human eye. The PSF refers to the effect of a point source of light being seen as light over an area. To hide seams the values of pixels near to the seam are adjusted in such a way as to mask the seam. The application of the PSF to improving tiled image quality relies on the above effects: At a sufficient viewing distance, the spread of light emitted from each pixel (which can be regarded as a point of light) overlaps with light also spread via PSF from one or more adjacent pixels. It is preferred to distribute the changes in luminosity over a distance greater than the pixel spacing. This avoids are large transition at the seam. Hence, the increase or decrease in luminosity can be graded over several pixels in a direction perpendicular to the seam.

Similarly a display can be perceived as seamless from a defined distance using methods and formulae for distributed variation correction known for example from EP 2128846 which is incorporated herein by reference.

According to another embodiment of the present invention the method or system further comprises adjusting the displaying of pixelated image information by applying a distributed variation correction signal to the displaying of the pixelated display information. Adjusting the displaying of the pixelated image information may thereby comprise adjusting the pixelated image information such that other pixelated image information is displayed, i.e. adjusting the displaying by processing the pixelated image information. Adjusting of the display device includes adjusting the DLEDs. The induced distributed variation correction signal may provide a brightness and/or color variation. As well as seam hiding FFC (=Fast Field Calibration), can also be carried out e.g. brightness compensation in the field get better uniformity of brightness. For example, it may be a spatially varying correction to the brightness and/or color variation, providing a spatially varying correction signal in brightness and/or color for different pixels. The distributed variation correction signal thereby may be selected such that on average no variation in the brightness or color is achieved. In other words, the corrections are such that these are averaged out by the human eye and thus the variations as such are visually eliminated, resulting in a brightness or color value as expected. Such corrections may assist in optically hiding non-uniformities induced by the seams. This may by the introduced by a distribution of dither or noise patterns which are averaged out by the human eye. In one embodiment, the distributed variation correction may be considered as noise transposed on the normal brightness levels of the DLED for generating the image. The distributed variation correction signal can be applied taking into account the influence of a seam or seams on the optical non-uniformity of the displaying of images.

The distributed variation correction may be a temporally static distributed variation correction. The distributed variation correction may be a temporally dynamic distributed variation correction. The dynamic character may imply a variation in time, e.g. a variation between different frames of the image information to be displayed. The distributed variation correction may be a variation in amplitude or a variation in bandwidth.

The correction signal may be received from an external source or may be calculated, e.g. using predetermined algorithms, neural networks, mathematical methods, etc. based on analyzing the digital picture taken by the digital camera. The method may comprise generating the distributed variation correction signals according to a predetermined algorithm, whereby the distributed variation depends or is function of the brightness level or levels of at least one seam using the analysis of the digital picture taken by the digital camera. The adjusted pixelated image information can be obtained by adding to the pixelated image information and the distributed variation correction signal.

In some embodiments, the method and system may comprise generating distributed variation correction signals in a processor of the display device. The distributed variation correction signal may for example be generated by a random generator for generating from pixel to pixel different values that have a certain distribution. The kind of distribution thereby may be adjusted depending on seams visible in the digital picture taken by the digital camera. If a tiled display system, the method may comprise generating distributed variation correction signals at a central processor common to the different tiles. In this case the distributed variation correction signals are split into the pixelated display information for particular tiles. Alternatively or in addition thereto the method system may comprise generating distributed variation signals at distributed processors, each for a different display tile and/or applying the distributed variation correction signals at the distributed processors.

In a further optional aspect, the method or system may comprise providing a feedback of the adjustment by means of a further digital picture from the digital camera.

In embodiments of the present invention the distributed variation correction signals to be applied may be controlled or adjusted in an iterative process, whereby first distributed variation correction signals are applied, the output of the display system is determined by a further digital picture by the digital camera and the distributed variation correction signals are further adapted in view of the new digital picture. In this way an automatic system for having optimal correction may be obtained. The adjustment of the distributed variation correction signal may for example comprise adjusting the intensity or the correction signal, the spatial and/or frequency distribution thereof etc.

Embodiments of the present invention also relate to an image processor for processing pixelated display information for a display system. Such an image processor can process software running on a microprocessor on the electronic digital processing device such as a computer, a laptop, a tablet, a smartphone, a PDA or similar or on the server mentioned above. Such an image processor can comprises an adjustment means for adjusting obtained pixelated image information by applying a seam correction of compensation as mentioned above, e.g. with respect to FIG. 5 or 23 or 14. That seam correction or compensation can include a mathematical function such as averaging mentioned above or more complex algorithms such as distributed variation correction signal to the displaying of the pixelated image information which influences the display uniformity of the displaying of images. The processor furthermore may comprise features and components having the functionality of the different method features described above. The processor may be a processor common to the different tiles, or it may be a plurality of sub-processors, each processor adapted for processing image information of one or more tiles. The controller may include a computing device, e.g. microprocessor, for instance it may be a micro-controller. In particular, it may include a programmable controller, for instance a programmable digital logic device such as a Programmable Array Logic (PAL), a Programmable Logic Array, a Programmable Gate Array, especially a Field Programmable Gate Array (FPGA). The use of an FPGA allows subsequent programming, e.g. by downloading the required settings of the FPGA.

Embodiments of the present invention further relate to a display system for displaying pixelated information, comprising an adjustment processor as described above. The display system may be a tiled display system based on addressable display technologies, such as for example phosphorescent, electroluminescent, organic or inorganic emissive, reflective or other known display technologies. By way of illustration, the present invention not being limited thereto, an exemplary display system is shown in FIG. 1 and/or FIG. 2 and FIG. 15A or 15B and the arrangements of FIG. 1 and/or FIG. 2 and FIGS. 15A and/or 15B are expressly here incorporated into these disclosures. Any of the above-described method embodiments of the present invention may be implemented in a processing system as shown in FIGS. 1, 2, 15A, 15B.

Embodiments of the present invention also include a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium or signal storage medium that carries out a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is to be understood that although preferred embodiments, specific constructions and configurations, as well as materials, have been discussed herein for devices according to the present invention, various changes or modifications in form and detail may be made without departing from the scope and spirit of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A tiled display system comprising:
two or more electronic display tiles;
each electronic display tile having a display surface that comprises a lattice of discrete light emitting devices,
each of the two or more electronic display tiles displaying a first optical identification by activating some of the discrete light emitting devices on the display tile, the first optical identification being unique to the display tile it is to identify,
wherein each of the two or more electronic display tiles display second optical identifications by activating some of the discrete light emitting devices on the two or more electronic display tiles, the second optical identifications identifying a position on a seam between adjacent display tiles, the second optical identifications comprising four corner points patterns in which the discrete light emitting devices are on or off and background discrete light emitting devices are off or on, respectively, and four edge patterns.

2. The tiled display system according to claim 1, wherein the first optical identification comprises first discrete light emitting devices in a first state and second discrete light emitting devices in a second state, the first and second states of the discrete light emitting devices being optically different.

3. The tiled display system according to claim 2, wherein the first discrete light emitting devices emit red light and second discrete light emitting devices emit white light.

4. The tiled display system according to claim 1, wherein the first optical identification is a code for a number.

5. The tiled display system according to claim 1, wherein the first optical identification is a code for a number, the first discrete light emitting devices being arranged in rows or columns, each number being coded by one or two rows or columns of the first discrete light emitting devices, each row or column having a number of discrete light emitting devices in a first state.

6. The tiled display system according to claim 1, further comprising a digital camera for taking a digital picture of the tiled display, and a digital picture analysis unit for analyzing the digital picture to determine the relative positions of the two or more electronic display tiles.

7. The tiled display system according to claim 6, wherein the digital picture analysis unit is configured to analyze the digital picture to determine the position of the seam.

8. The tiled display system according to claim 1, wherein the tiled display system is configured to adjust a displaying of an image on the two more electronic display tiles by optically camouflaging or hiding a seam between adjacent display tiles based at least on second optical identifications.

9. A method of operating a tiled display having two or more electronic display tiles; each electronic display tile having a display surface that comprises a lattice of discrete light emitting devices (DLED), the method comprising:
displaying on each of the two or more electronic display tiles a first optical identification by activating some of the discrete light emitting devices on the display tile, the first optical identification being unique to the display tile it is to identify,
wherein each of the two or more electronic display tiles display second optical identifications by activating some of the discrete light emitting devices on the two or more electronic display tiles, the second optical identifications identifying a position on a seam between adjacent display tiles, the second optical identifications comprising four corner points patterns in which the discrete light emitting devices are on or off and background discrete light emitting devices are off or on, respectively, and four edge patterns.

10. The method according to claim 9, further comprising displaying the first optical identification by bringing first discrete light emitting devices into a first state and second discrete light emitting devices into a second state, the first and second states of the discrete light emitting devices being optically different.

11. The method according to claim 10, wherein the first discrete light emitting devices emit red light and second discrete light emitting devices emit white light.

12. The method according to claim 9, wherein the first optical identification is a code for a number.

13. The method according to claim 9, further comprising coding the first optical identification for a number, the first discrete light emitting devices being arranged in rows or columns, each number being coded by one or two rows or columns of the first discrete light emitting devices.

14. The method according to claim 9, further comprising obtaining a digital picture of the tiled display with a digital camera, and analyzing the digital picture to determine the relative positions of the two or more electronic display tiles.

15. The method according to claim 14, further comprising analyzing the digital picture to determine the position of the seam.

16. A tiled display comprising:
two or more electronic display tiles;
each electronic display tile having a display surface that comprises a lattice of discrete light emitting devices,
each of the two or more electronic display tiles displaying a first optical identification by activating some of the discrete light emitting devices on the display tile, the first optical identification being unique to the display tile it is to identify,
wherein each of the two or more electronic display tiles display second optical identifications by activating some of the discrete light emitting devices on the two or more electronic display tiles, the second optical identifications identifying a position on a seam between adjacent display tiles, the second optical identifications comprising four corner points patterns in which the discrete light emitting devices are on or off and background discrete light emitting devices are off or on, respectively, and four edge patterns.

17. The tiled display according to claim 16, wherein the first optical identification comprises first discrete light emitting devices in a first state and second discrete light emitting devices in a second state, the first and second states of the discrete light emitting devices being optically different.

18. The tiled display according to claim 17, wherein the first discrete light emitting devices emit red light or are dark and second discrete light emitting devices emit white light.

19. The tiled display according to claim 16, wherein the first optical identification is a code for a number.

20. The tiled display according to claim 16, wherein the first optical identification is a code for a number, the first discrete light emitting devices being arranged in rows or columns, each number being coded by one or two rows or columns of the first discrete light emitting devices.

\* \* \* \* \*